United States Patent
Fukui et al.

(10) Patent No.: US 12,540,122 B2
(45) Date of Patent: Feb. 3, 2026

(54) NUCLEATING AGENT, SYNTHETIC-RESIN COMPOSITION CONTAINING SAME, AND MOLDED OBJECT THEREOF

(71) Applicant: ADEKA CORPORATION, Tokyo (JP)

(72) Inventors: Satoshi Fukui, Tokyo (JP); Naoto Ueda, Tokyo (JP)

(73) Assignee: ADEKA CORPORATION, Tokyo (JP)

(*) Notice: Subject to any disclaimer, the term of this patent is extended or adjusted under 35 U.S.C. 154(b) by 1162 days.

(21) Appl. No.: 17/279,817

(22) PCT Filed: Sep. 25, 2019

(86) PCT No.: PCT/JP2019/037567
§ 371 (c)(1),
(2) Date: Mar. 25, 2021

(87) PCT Pub. No.: WO2020/067144
PCT Pub. Date: Apr. 2, 2020

(65) Prior Publication Data
US 2021/0395209 A1  Dec. 23, 2021

(30) Foreign Application Priority Data
Sep. 26, 2018 (JP) ................. 2018-180529

(51) Int. Cl.
C08K 5/3492 (2006.01)
C07D 251/30 (2006.01)

(52) U.S. Cl.
CPC .......... C07D 251/30 (2013.01); C08K 5/3492 (2013.01)

(58) Field of Classification Search
CPC .................................... C08K 5/3492
See application file for complete search history.

(56) References Cited

U.S. PATENT DOCUMENTS

| | | | |
|---|---|---|---|
| 3,275,592 | A | 9/1966 | Oswald et al. |
| 3,367,926 | A | 2/1968 | Voeks |
| 5,723,067 | A | 3/1998 | Mormann et al. |
| 2003/0139507 | A1 | 7/2003 | Teramoto et al. |
| 2007/0149663 | A1 | 6/2007 | Schmidt et al. |
| 2011/0136950 | A1 | 6/2011 | Yu et al. |
| 2017/0233551 | A1 | 8/2017 | Ueda et al. |

FOREIGN PATENT DOCUMENTS

| | | |
|---|---|---|
| CN | 105541823 A | 5/2016 |
| CN | 105732712 A | 7/2016 |
| CN | 106478986 A | 3/2017 |
| DE | 11 83 507 B | 12/1964 |
| EP | 2 977 408 A1 | 1/2016 |
| JP | 54-4950 A | 1/1979 |
| JP | 57-188576 A | 11/1982 |
| JP | 61-14261 A | 1/1986 |
| JP | 2006-518402 A | 8/2006 |
| JP | 2015-218204 A | 12/2015 |
| WO | WO 02/074852 A1 | 9/2002 |

OTHER PUBLICATIONS

Ohno, Daisuke, et al. "Formation of Hybrid Ring Structure of Cyanurate/Isocyanurate in the Reaction between 2,4,6-Tris(4-Phenyl-Phenoxy)-1,3,5-Triazine and Phenyl Glycidyl Ether." International Journal of Organic Chemistry. (2016), vol. 6, pp. 117-125. (Year: 2016).*

"What is Mold Making?" Accessed Jan. 14, 2025. Published on: Jun. 6, 2017. Available from: < https://composimoldstore.com/blog/what-is-mold-making/?srsltid=AfmBOorPLGJzi6SkgUeVVoqASDzLXh5sH-njb64OdfAhZRpQMpOAjMqf >. (Year: 2017).*

International Search Report (PCT/ISA/210) issued in PCT/JP2019/037567 mailed on Nov. 12, 2019.

Written Opinion (PCT/ISA/237) issued in PCT/JP2019/037567 mailed on Nov. 12, 2019.

Extended European Search Report dated May 16, 2022 for Application No. 19865622.5.

Hajipour et al., "Chitosan-Supported Ni particles: An Efficient Nanocatalyst for Direct Amination of Phenols", Appl Organometal Chem., vol. 32, No. 4, 2018, pp. 1-10.

Howell, "Development of additives possessing both solid-phase and gas-phase flame retardant activities", Polymer Degradation and Stability, vol. 93, No. 11, 2008, (Available online Jul. 23, 2008), pp. 2052-2057.

(Continued)

*Primary Examiner* — John S Kenyon
(74) *Attorney, Agent, or Firm* — Birch, Stewart, Kolasch & Birch, LLP

(57) ABSTRACT

Provided are: a novel nucleating agent capable of imparting excellent transparency to synthetic resins; a synthetic resin composition containing the same; and a molded object of the synthetic resin composition. The nucleating agent contains at least one triazine compound represented by Formula (1), wherein $Ar^1$, $Ar^2$ and $Ar^3$ each independently represent an unsubstituted phenyl group or a substituted phenyl group. In Formula (1), for example, the number of substituents of the substituted phenyl group is preferably 1, and $Ar^1$, $Ar^2$ and $Ar^3$ are preferably all different groups.

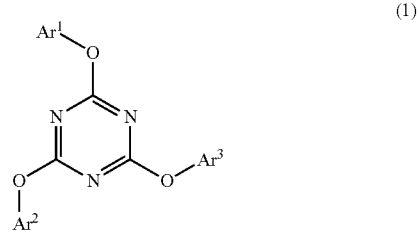

19 Claims, No Drawings

(56) References Cited

OTHER PUBLICATIONS

Iranpoor et al., "Nickel-Catalyzed One-Pot Deoxygenation and Reductive Homocoupling of Phenols via C-O Activation Using TCT Reagent". Organic Letters, vol. 17, No. 2. 2015 (Published Dec. 26, 2014), pp. 214-217.
Manecke et al., "Reaktionsfähige Hochpolymere mit Dichlor-s-triazin-Gruppen", Aus dem Fritz-Institut der Max-Planck-Gesellschaft, vol. 81, Jan. 1964, pp. 129-136.
Pogosyan et al., "Study of the polycondensation of 2-substituted 4,6-bis(p-carboxyphenoxy)-s-triazine acid chlorides with some bisphenols", Chemical abstracts service Database, accession No. 1977:518135, 1977, 1 page.
Sagar et al., "Microwave Assisted Synthesis of Triaryl Cyanurates", Synthetic Communications, vol. 30, No. 10, 2000, pp. 1719-1723.
Wirasaputra et al., "Flame-Retarded Epoxy Resins with a Curing Agent of DOPO-Triazine Based Anhydride", Macromolecular Materials and Engineering, vol. 301, No. 8., 2016, pp. 982-991.
English translation of Office Action for corresponding Russian Application No. 2021111601, issued Oct. 31, 2022.
Nikolaevich, "Modification of the structure of polypropylene under the action of small additives of nucleating agents and molecular weight regulators," Abstract of the PhD (Technology) thesis, Moscow. 2007, 2 pages.
Ugay, "General and Inorganic Chemistry," University Manual in Chemistry, Moscow. Vysshaya Shkola Publishing House. 1997, 2 pages.

* cited by examiner

NUCLEATING AGENT, SYNTHETIC-RESIN COMPOSITION CONTAINING SAME, AND MOLDED OBJECT THEREOF

TECHNICAL FIELD

The present invention relates to a nucleating agent, a synthetic resin composition containing the same, and a molded object of the synthetic resin composition. More particularly, the present invention relates to: a novel nucleating agent which can impart excellent transparency to synthetic resins; a synthetic resin composition containing the same; and a molded object of the synthetic resin composition.

BACKGROUND ART

Synthetic resins, particularly polyolefin-based resins, have advantages in their excellent moldability, heat resistance, mechanical properties, low specific gravity and the like; therefore, they are widely used in films, sheets and various molded objects (such as structural components). However, although polyolefin-based resins per se generally have excellent physical properties, there are cases where the use of a polyolefin-based resin is restricted depending on a certain type of application since the excellent performance intrinsic to the resin cannot be exerted.

This drawback is attributed to the crystallinity of polyolefin-based resins. A variety of nucleating agents are widely used for improving the crystallinity of a polyolefin-based resin and thereby improving the resin transparency.

Examples of such nucleating agents include metal carboxylates, such as sodium benzoate, 4-tert-butylbenzoate aluminum salt, sodium adipate, and 2-sodium-bicyclo[2.2.1]heptane-2,3-dicarboxylate; metal phosphates, such as sodium-bis(4-tert-butylphenyl)phosphate, sodium-2,2'-methylene-bis(4,6-di-tert-butylphenyl)phosphate, and lithium-2,2'-methylene-bis(4,6-di-tert-butylphenyl)phosphate; and polyhydric alcohol derivatives, such as dibenzylidene sorbitol, bis(methylbenzylidene)sorbitol, and bis (dimethylbenzylidene)sorbitol.

Patent Document 1 proposes a trisamide compound as a nucleating agent that reduces the haze of a polymer. Further, Patent Document 2 proposes a trisaryloxytriazine compound as a stabilizer for improving the thermal stability of halogen-containing resins, such as vinyl chloride resins. Moreover, Patent Document 3 proposes a trisaryloxytriazine compound as a fluidity improver for synthetic resins.

RELATED ART DOCUMENTS

Patent Documents

[Patent Document 1] JP2006-518402A
[Patent Document 2] JPS54-4950A
[Patent Document 3] JPS61-14261A

SUMMARY OF THE INVENTION

Problems to be Solved by the Invention

However, the nucleating agent proposed in Patent Document 1 does not have sufficient performance as a nucleating agent of a synthetic resin, and the improvement in the optical characteristics such as transparency that is attained by this nucleating agent is not satisfactory. In addition, at present, neither the trisaryloxytriazine compound proposed in Patent Document 2 nor the trisaryloxytriazine compound proposed in Patent Document 3 has been examined as a nucleating agent of a synthetic resin.

In view of the above, an object of the present invention is to provide: a novel nucleating agent that can impart excellent transparency to synthetic resins; a synthetic resin composition containing the same; and a molded object of the synthetic resin composition.

Means for Solving the Problems

The present inventors intensively studied to solve the above-described problems and consequently discovered that a triazine compound having a prescribed structure is an excellent nucleating agent for synthetic resins and that the above-described problems can be solved by using this triazine compound, thereby completing the present invention.

That is, a nucleating agent of the present invention is characterized by containing at least one triazine compound represented by the following Formula (1):

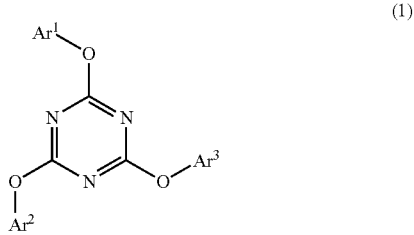

wherein $Ar^1$, $Ar^2$ and $Ar^3$ each independently represent an unsubstituted phenyl group or a substituted phenyl group.

The nucleating agent of the present invention is preferably one in which the number of substituents of the substituted phenyl group in Formula (1) is 1 and, in this case, the substituent of the substituted phenyl group in Formula (1) is preferably located at the para-position. It is also preferred that $Ar^1$, $Ar^2$ and $Ar^3$ in Formula (1) be all different groups. Further, in Formula (1), $Ar^1$ and $Ar^2$ may be the same group and $Ar^3$ may be a group different from $Ar^1$ and $Ar^2$ and, in this case, $Ar^1$ and $Ar^2$ are preferably unsubstituted phenyl groups. Still further, in Formula (1), $Ar^1$, $Ar^2$ and $Ar^3$ may all be substituted phenyl groups and, in this case, it is preferred that $Ar^1$ and $Ar^2$ have the same substituent and $Ar^3$ has a substituent different from that of $Ar^1$ and $Ar^2$. Yet still further, it is preferred that at least one of substituted phenyl groups in Formula (1) has a substituent containing a carbonyl group in its structure and that $Ar^3$ in Formula (1) has the substituent containing a carbonyl group in its structure.

The synthetic resin composition of the present invention is characterized by containing a synthetic resin and at least one nucleating agent according to the present invention.

In the synthetic resin composition of the present invention, the synthetic resin is preferably a polyolefin-based resin.

A molded object of the present invention is characterized in that it is obtained from the synthetic resin composition of the present invention.

Effects of the Invention

According to the present invention, a novel nucleating agent that can impart excellent transparency to synthetic resins, a synthetic resin composition containing the same, and a molded object of the synthetic resin composition can be provided.

MODE FOR CARRYING OUT THE INVENTION

Embodiments of the present invention will now be described in detail.

The nucleating agent of the present invention contains at least one triazine compound represented by the following Formula (1):

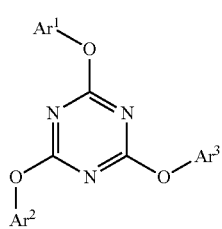

(1)

wherein $Ar^1$, $Ar^2$ and $Ar^3$ each independently represent an unsubstituted phenyl group or a substituted phenyl group.

Examples of a substituent of $Ar^1$, $Ar^2$ and $Ar^3$ in Formula (1) include a halogen atom, a hydroxy group, a carboxy group, an amino group, an aminocarbonyl group (also referred to as "carbamoyl group"), a nitro group, a cyano group, a thiol group, a sulfo group, a sulfonamide group, a formyl group, an optionally substituted alkyl group having 1 to 20 carbon atoms, an optionally substituted aryl group having 6 to 20 carbon atoms, an optionally substituted arylalkyl group having 7 to 20 carbon atoms, an optionally substituted alkoxy group having 1 to 20 carbon atoms, an optionally substituted aryloxy group having 6 to 20 carbon atoms, an optionally substituted alkylthio group having 1 to 20 carbon atoms, an optionally substituted alkylamino group having 1 to 20 carbon atoms, an optionally substituted dialkylamino group having 2 to 20 carbon atoms, an optionally substituted arylamino group having 6 to 20 carbon atoms, an optionally substituted diarylamino group having 12 to 20 carbon atoms, an optionally substituted alkylarylamino group having 7 to 20 carbon atoms, an optionally substituted alkylcarbonyl group having 2 to 20 carbon atoms, an optionally substituted arylcarbonyl group having 7 to 20 carbon atoms, an optionally substituted alkylcarbonyloxy group having 2 to 20 carbon atoms, an optionally substituted arylcarbonyloxy group having 7 to 20 carbon atoms, an optionally substituted alkoxycarbonyl group having 2 to 20 carbon atoms, an optionally substituted aryloxycarbonyl group having 7 to 20 carbon atoms, an optionally substituted alkylaminocarbonyl group having 2 to 20 carbon atoms, an optionally substituted arylaminocarbonyl group having 7 to 20 carbon atoms, an optionally substituted dialkylaminocarbonyl group having 3 to 20 carbon atoms, an optionally substituted diarylaminocarbonyl group having 13 to 20 carbon atoms, an optionally substituted alkylarylaminocarbonyl group having 8 to 20 carbon atoms, an optionally substituted alkylcarbonylamino group having 2 to 20 carbon atoms, an optionally substituted arylcarbonylamino group having 7 to 20 carbon atoms, and an optionally substituted heterocyclic group having 2 to 20 carbon atoms. The carboxy group and the sulfo group may each be in the form of a salt. Further, when the substituent of $Ar^1$, $Ar^2$ and $Ar^3$ may have a substituent, examples thereof include the followings.

Alkyl groups, such as methyl, ethyl, propyl, isopropyl, cyclopropyl, butyl, sec-butyl, tert-butyl, isobutyl, amyl, isoamyl, tert-amyl, cyclopentyl, hexyl, 2-hexyl, 3-hexyl, cyclohexyl, bicyclohexyl, 1-methylcyclohexyl, heptyl, 2-heptyl, 3-heptyl, isoheptyl, tert-heptyl, n-octyl, isooctyl, tert-octyl, 2-ethylhexyl, nonyl, isononyl, and decyl;

alkoxy groups, such as methyloxy, ethyloxy, propyloxy, isopropyloxy, butyloxy, sec-butyloxy, tert-butyloxy, isobutyloxy, amyloxy, isoamyloxy, tert-amyloxy, hexyloxy, cyclohexyloxy, heptyloxy, isoheptyloxy, tert-heptyloxy, n-octyloxy, isooctyloxy, tert-octyloxy, 2-ethylhexyloxy, nonyloxy, and decyloxy;

alkylthio groups, such as methylthio, ethylthio, propylthio, isopropylthio, butylthio, sec-butylthio, tert-butylthio, isobutylthio, amylthio, isoamylthio, tert-amylthio, hexylthio, cyclohexylthio, heptylthio, isoheptylthio, tert-heptylthio, n-octylthio, isooctylthio, tert-octylthio, and 2-ethylhexylthio;

alkenyl groups, such as vinyl, 1-methylethenyl, 2-methylethenyl, 2-propenyl, 1-methyl-3-propenyl, 3-butenyl, 1-methyl-3-butenyl, isobutenyl, 3-pentenyl, 4-hexenyl, cyclohexenyl, bicyclohexenyl, heptenyl, octenyl, decenyl, pentadecenyl, eicosenyl, and tricosenyl;

arylalkyl groups, such as benzyl, phenethyl, diphenylmethyl, triphenylmethyl, styryl, and cinnamyl;

aryl groups, such as phenyl and naphthyl;

aryloxy groups, such as phenoxy and naphthyloxy;

arylthio groups, such as phenylthio and naphthylthio;

heterocyclic groups, such as pyridyl, pyrimidyl, pyridazyl, piperidyl, pyranyl, pyrazolyl, triazyl, pyrrolyl, quinolyl, isoquinolyl, imidazolyl, benzimidazolyl, triazolyl, furyl, furanyl, benzofuranyl, thienyl, thiophenyl, benzothiophenyl, thiadiazolyl, thiazolyl, benzothiazolyl, oxazolyl, benzoxazolyl, isothiazolyl, isoxazolyl, indolyl, 2-pyrrolidinon-1-yl, 2-piperidon-1-yl, 2,4-dioxyimidazolidin-3-yl, and 2,4-dioxyoxazolidin-3-yl;

halogen atoms, such as fluorine, chlorine, bromine, and iodine;

acyl groups, such as acetyl, 2-chloroacetyl, propionyl, octanoyl, acryloyl, methacryloyl, phenylcarbonyl(benzoyl), phthaloyl, 4-trifluoromethylbenzoyl, pivaloyl, salicyloyl, oxaloyl, stearoyl, methoxycarbonyl, ethoxycarbonyl, t-butoxycarbonyl, n-octadecyloxycarbonyl, and carbamoyl;

acyloxy groups, such as acetyloxy and benzoyloxy;

substituted or unsubstituted amino groups, such as amino, ethylamino, methylamino, diethylamino, butylamino, cyclopentylamino, 2-ethylhexylamino, dodecylamino, anilino, chlorophenylamino, toluidino, anisidino, N-methyl-anilino, diphenylamino, naphthylamino, 2-pyridylamino, methoxycarbonylamino, phenoxycarbonylamino, acetylamino, benzoylamino, formylamino, pivaloylamino, lauroylamino, carbamoylamino, N,N-dimethylaminocarbonylamino, N,N-diethylaminocarbonylamino, morpholinocarbonylamino, methoxycarbonylamino, ethoxycarbonylamino, t-butoxycarbonylamino, n-octadecyloxycarbonylamino, N-methylmethoxycarbonylamino, phenoxycarbonylamino, sulfamoylamino, N,N-dimethylaminosulfonylamino, methylsulfonylamino, butylsulfonylamino, and phenylsulfonylamino;

a sulfonamide group; a sulfonyl group; a carboxy group; a cyano group; a sulfo group; a hydroxy group; a nitro group; a mercapto group; an imide group; a carbamoyl group; and a sulfonamide group. These groups are optionally further substituted. Moreover, the carboxy group and the sulfo group may each be in the form of a salt.

Examples of the halogen atom, which may be the substituent of $Ar^1$, $Ar^2$ and $Ar^3$ in Formula (1), include fluorine, chlorine, bromine, and iodine.

Examples of the optionally substituted alkyl group having 1 to 20 carbon atoms, which may be the substituent of $Ar^1$, $Ar^2$ and $Ar^3$ in Formula (1), include unsubstituted alkyl groups having 1 to 20 carbon atoms, such as methyl, ethyl, n-propyl, isopropyl, n-butyl, isobutyl, sec-butyl, tert-butyl, n-pentyl, isopentyl, neopentyl, tert-amyl, 1,2-dimethylpropyl, n-hexyl, cyclohexyl, 1,3-dimethylbutyl, 1-isopropylpropyl, 1,2-dimethylbutyl, n-heptyl, 2-heptyl, 1,4-dimethylpentyl, tert-heptyl, 2-methyl-1-isopropylpropyl, 1-ethyl-3-methylbutyl, n-octyl, tert-octyl, 2-ethylhexyl, 2-methylhexyl, 2-propylhexyl, n-nonyl, isononyl, n-decyl, isodecyl, n-undecyl, isoundecyl, n-dodecyl, isododecyl, n-tridecyl, isotridecyl, n-tetradecyl, isotetradecyl, n-pentadecyl, isopentadecyl, n-hexadecyl, isohexadecyl, n-heptadecyl, isoheptadecyl, n-octadecyl, isooctadecyl, n-nonadecyl, isononadecyl, n-icosyl, isoicosyl, cyclopentyl, cyclohexyl, cyclooctyl, and cyclododecyl. Alkylene moieties of these alkyl groups may be interrupted at 1 to 5 positions by an unsaturated bond, an ether bond, a thioether bond, an ester bond, a thioester bond, an amide bond, or an urethane bond.

Examples of the optionally substituted aryl group having 6 to 20 carbon atoms, which may be the substituent of $Ar^1$, $Ar^2$ and $Ar^3$ in Formula (1), include phenyl, p-methylphenyl, o-methylphenyl, p-tert-butylphenyl, p-methoxyphenyl, p-chlorophenyl, p-nitrophenyl, p-cyanophenyl, o-biphenylyl, m-biphenylyl, p-biphenylyl, α-naphthyl, β-naphthyl, 1-anthryl, 2-anthryl, 9-anthryl, 1-phenanthryl, 2-phenanthryl, 3-phenanthryl, 4-phenanthryl, and 9-phenanthryl.

Examples of the optionally substituted arylalkyl group having 7 to 20 carbon atoms, which may be the substituent of $Ar^1$, $Ar^2$ and $Ar^3$ in Formula (1), include benzyl, phenethyl, 2-phenylpropan-2-yl, styryl, cinnamyl, diphenylmethyl, and triphenylmethyl.

Examples of the optionally substituted alkoxy group having 1 to 20 carbon atoms, which may be the substituent of $Ar^1$, $Ar^2$ and $Ar^3$ in Formula (1), include those corresponding to the above-exemplified alkyl groups, specifically methoxy, ethoxy, n-propoxy, isopropoxy, n-butoxy, isobutoxy, sec-butoxy, tert-butoxy, n-pentyloxy, isopentyloxy, neopentyloxy, 1,2-dimethyl-propoxy, n-hexyloxy, cyclohexyloxy, 1,3-dimethylbutoxy, and 1-isopropylpropoxy.

Examples of the optionally substituted aryloxy group having 6 to 20 carbon atoms, which may be the substituent of $Ar^1$, $Ar^2$ and $Ar^3$ in Formula (1), include those corresponding to the above-exemplified aryl groups, specifically phenoxy, naphthyloxy, p-methylphenoxy, o-methylphenoxy, p-tert-butylphenoxy, p-methoxyphenoxy, p-chlorophenoxy, p-nitrophenoxy, p-cyanophenoxy, o-biphenylyloxy, m-biphenylyloxy, p-biphenylyloxy, α-naphthyloxy, β-naphthyloxy, 1-anthryloxy, 2-anthryloxy, 9-anthryloxy, 1-phenanthryloxy, 2-phenanthryloxy, 3-phenanthryloxy, 4-phenanthryloxy, and 9-phenanthryloxy.

Examples of the optionally substituted alkylthio group having 1 to 20 carbon atoms, which may be the substituent of $Ar^1$, $Ar^2$ and $Ar^3$ in Formula (1), include those corresponding to the above-exemplified alkyl groups, specifically a methylthio group, an ethylthio group, an n-propylthio group, an isopropylthio group, an n-butylthio group, an isobutylthio group, a sec-butylthio group, and a tert-butylthio group.

Examples of the optionally substituted alkylamino group having 1 to 20 carbon atoms, which may be the substituent of $Ar^1$, $Ar^2$ and $Ar^3$ in Formula (1), include those corresponding to the above-exemplified alkyl groups, specifically methylamino, ethylamino, n-propylamino, isopropylamino, cyclopropylamino, n-butylamino, isobutylamino, sec-butylamino, tert-butylamino, cyclobutylamino, 1-pentylamino, 2-pentylamino, 3-pentylamino, isopentylamino, neopentylamino, tert-pentylamino, cyclopentylamino, 1-hexylamino, 2-hexylamino, 3-hexylamino, cyclohexylamino, 1-methyl-n-pentylamino, 1,1,2-trimethyl-n-propylamino, 1,2,2-trimethyl-n-propylamino, and 3,3-dimethyl-n-butylamino.

Examples of the optionally substituted dialkylamino group having 2 to 20 carbon atoms, which may be the substituent of $Ar^1$, $Ar^2$ and $Ar^3$ in Formula (1), include those corresponding to the above-exemplified alkyl groups, specifically dimethylamino, diethylamino, di-n-propylamino, diisopropylamino, dicyclopropylamino, di-n-butylamino, diisobutylamino, di-sec-butylamino, di-tert-butylamino, dicyclobutylamino, di-1-pentylamino, di-2-pentylamino, di-3-pentylamino, diisopentylamino, di-neopentylamino, di-tert-pentylamino, dicyclopentylamino, di-1-hexylamino, di-2-hexylamino, di-3-hexylamino, dicyclohexylamino, di-(1-methyl-n-pentyl)amino, di-(1,1,2-trimethyl-n-propyl)amino, di-(1,2,2-trimethyl-n-propyl)amino, di-(3,3-dimethyl-n-butyl)amino, methyl(ethyl)amino, methyl(n-propyl)amino, methyl(isopropyl)amino, methyl(cyclopropyl)amino, methyl(n-butyl)amino, methyl(isobutyl)amino, methyl(sec-butyl)amino, methyl(tert-butyl)amino, methyl(cyclobutyl)amino, ethyl(n-propyl)amino, ethyl(isopropyl)amino, ethyl(cyclopropyl)amino, ethyl(n-butyl)amino, ethyl(isobutyl)amino, ethyl(sec-butyl)amino, ethyl(tert-butyl)amino, ethyl(cyclobutyl)amino, n-propyl(isopropyl)amino, n-propyl(cyclopropyl)amino, n-propyl(n-butyl)amino, n-propyl(isobutyl)amino, n-propyl(sec-butyl)amino, n-propyl(tert-butyl)amino, n-propyl(cyclobutyl)amino, isopropyl(cyclopropyl)amino, isopropyl(n-butyl)amino, isopropyl(isobutyl)amino, isopropyl(sec-butyl)amino, isopropyl(tert-butyl)amino, isopropyl(cyclobutyl)amino, cyclopropyl(n-butyl)amino, cyclopropyl(isobutyl)amino, cyclopropyl(sec-butyl)amino, cyclopropyl(tert-butyl)amino, cyclopropyl(cyclobutyl)amino, n-butyl(isobutyl)amino, n-butyl(sec-butyl)amino, n-butyl(tert-butyl)amino, n-butyl(cyclobutyl)amino, isobutyl(sec-butyl)amino, isobutyl(tert-butyl)amino, isobutyl(cyclobutyl)amino, sec-butyl(tert-butyl)amino, sec-butyl(cyclobutyl)amino, and tert-butyl(cyclobutyl)amino.

Examples of the optionally substituted arylamino group having 6 to 20 carbon atoms, which may be the substituent of $Ar^1$, $Ar^2$ and $Ar^3$ in Formula (1), include those corresponding to the above-exemplified aryl groups, specifically phenylamino, naphthylamino, p-methylphenylamino, o-methylphenylamino, p-tert-butylphenylamino, p-methoxyphenylamino, p-chlorophenylamino, p-nitrophenylamino, p-cyanophenylamino, o-biphenylylamino, m-biphenylylamino, p-biphenylylamino, α-naphthylamino, β-naphthylamino, 1-anthrylamino, 2-anthrylamino, 9-anthrylamino, 1-phenanthrylamino, 2-phenanthrylamino, 3-phenanthrylamino, 4-phenanthrylamino, and 9-phenanthrylamino.

Examples of the optionally substituted diarylamino group having 12 to 20 carbon atoms, which may be the substituent of $Ar^1$, $Ar^2$ and $Ar^3$ in Formula (1), include those corresponding to the above-exemplified aryl groups, specifically diphenylamino, dinaphthylamino, and phenylnaphthylamino.

Examples of the optionally substituted alkylarylamino group having 7 to 20 carbon atoms, which may be the substituent of $Ar^1$, $Ar^2$ and $Ar^3$ in Formula (1), include those corresponding to the above-exemplified alkyl groups and aryl groups, specifically methylphenylamino, ethylphenylamino, isopropylphenylamino, sec-butylphenylamino, tert-butylphenylamino, n-hexylphenylamino, cyclohexylphenylamino, methylnaphthylamino, and ethylnaphthylamino.

Examples of the optionally substituted alkylcarbonyl group having 2 to 20 carbon atoms, which may be the substituent of $Ar^1$, $Ar^2$ and $Ar^3$ in Formula (1), include those corresponding to the above-exemplified alkyl groups, specifically methylcarbonyl (also referred to as "acetyl"), ethylcarbonyl, n-propylcarbonyl, isopropylcarbonyl, n-butylcarbonyl, isobutylcarbonyl, sec-butylcarbonyl, tert-butylcarbonyl, 1-pentylcarbonyl, 2-pentylcarbonyl, 3-pentylcarbonyl, isopentylcarbonyl, neopentylcarbonyl, tert-pentylcarbonyl, 1-hexylcarbonyl, 2-hexylcarbonyl, 3-hexylcarbonyl, and cyclohexylcarbonyl.

Examples of the optionally substituted arylcarbonyl group having 7 to 20 carbon atoms, which may be the substituent of $Ar^1$, $Ar^2$ and $Ar^3$ in Formula (1), include those corresponding to the above-exemplified aryl groups, specifically benzoyl, p-methylbenzoyl, p-tert-butylbenzoyl, p-methoxybenzoyl, p-chlorobenzoyl, p-nitrobenzoyl, p-cyanobenzoyl, o-biphenylylcarbonyl, m-biphenylylcarbonyl, p-biphenylylcarbonyl, α-naphthylcarbonyl, β-naphthylcarbonyl, 1-anthrylcarbonyl, 2-anthrylcarbonyl, 9-anthrylcarbonyl, 1-phenanthrylcarbonyl, 2-phenanthrylcarbonyl, 3-phenanthrylcarbonyl, 4-phenanthrylcarbonyl, and 9-phenanthrylcarbonyl.

Examples of the optionally substituted alkylcarbonyloxy group having 2 to 20 carbon atoms, which may be the substituent of $Ar^1$, $Ar^2$ and $Ar^3$ in Formula (1), include those corresponding to the above-exemplified alkyl groups, specifically methylcarbonyloxy, ethylcarbonyloxy, n-propylcarbonyloxy, isopropylcarbonyloxy, n-butylcarbonyloxy, isobutylcarbonyloxy, sec-butylcarbonyloxy, tert-butylcarbonyloxy, pentylcarbonyloxy, hexylcarbonyloxy, cyclohexylcarbonyloxy, heptylcarbonyloxy, and heptan-3-ylcarbonyloxy.

Examples of the optionally substituted arylcarbonyloxy group having 7 to 20 carbon atoms, which may be the substituent of $Ar^1$, $Ar^2$ and $Ar^3$ in Formula (1), include those corresponding to the above-exemplified aryl groups, specifically benzoyloxy, p-methylbenzoyloxy, p-tert-butylbenzoyloxy, p-methoxybenzoyloxy, p-chlorobenzoyloxy, p-nitrobenzoyloxy, p-cyanobenzoyloxy, o-biphenylylcarbonyloxy, m-biphenylylcarbonyloxy, p-biphenylylcarbonyloxy, α-naphthylcarbonyloxy, β-naphthylcarbonyloxy, 1-anthrylcarbonyloxy, 2-anthrylcarbonyloxy, 9-anthrylcarbonyloxy, 1-phenanthrylcarbonyloxy, 2-phenanthrylcarbonyloxy, 3-phenanthrylcarbonyloxy, 4-phenanthrylcarbonyloxy, and 9-phenanthrylcarbonyloxy.

Examples of the optionally substituted alkoxycarbonyl group having 2 to 20 carbon atoms, which may be the substituent of $Ar^1$, $Ar^2$ and $Ar^3$ in Formula (1), include those corresponding to the above-exemplified alkyl groups, specifically methoxycarbonyl, ethoxycarbonyl, n-propoxycarbonyl, isopropoxycarbonyl, n-butoxycarbonyl, isobutoxycarbonyl, sec-butoxycarbonyl, tert-butoxycarbonyl, 1-pentyloxycarbonyl, 2-pentyloxycarbonyl, 3-pentyloxycarbonyl, isopentyloxycarbonyl, neopentyloxycarbonyl, tert-pentyloxycarbonyl, 1-hexyloxycarbonyl, 2-hexyloxycarbonyl, 3-hexyloxycarbonyl, and cyclohexyloxycarbonyl.

Examples of the optionally substituted aryloxycarbonyl group having 7 to 20 carbon atoms, which may be the substituent of $Ar^1$, $Ar^2$ and $Ar^3$ in Formula (1), include those corresponding to the above-exemplified aryl groups, specifically phenoxycarbonyl, p-methylphenoxycarbonyl, naphthyloxycarbonyl, biphenylyloxycarbonyl, anthryloxycarbonyl, and phenanthryloxycarbonyl.

Examples of the optionally substituted alkylaminocarbonyl group having 2 to 20 carbon atoms, which may be the substituent of $Ar^1$, $Ar^2$ and $Ar^3$ in Formula (1), include those corresponding to the above-exemplified alkyl groups, specifically methylaminocarbonyl, ethylaminocarbonyl, n-propylaminocarbonyl, isopropylaminocarbonyl, n-butylaminocarbonyl, isobutylaminocarbonyl, sec-butylaminocarbonyl, tert-butylaminocarbonyl, 1-pentylaminocarbonyl, 2-pentylaminocarbonyl, 3-pentylaminocarbonyl, i-pentylaminocarbonyl, neopentylaminocarbonyl, tert-pentylaminocarbonyl, 1-hexylaminocarbonyl, 2-hexylaminocarbonyl, 3-hexylaminocarbonyl, and cyclohexylaminocarbonyl.

Examples of the optionally substituted arylaminocarbonyl group having 7 to 20 carbon atoms, which may be the substituent of $Ar^1$, $Ar^2$ and $Ar^3$ in Formula (1), include those corresponding to the above-exemplified aryl groups, specifically phenylaminocarbonyl, naphthylaminocarbonyl, p-methylphenylaminocarbonyl, o-methylphenylaminocarbonyl, p-tert-butylphenylaminocarbonyl, p-methoxyphenylaminocarbonyl, p-chlorophenylaminocarbonyl, p-nitrophenylaminocarbonyl, p-cyanophenylaminocarbonyl, o-biphenylylaminocarbonyl, m-biphenylylaminocarbonyl, p-biphenylylaminocarbonyl, α-naphthylaminocarbonyl, β-naphthylaminocarbonyl, 1-anthrylaminocarbonyl, 2-anthrylaminocarbonyl, 9-anthrylaminocarbonyl, 1-phenanthrylaminocarbonyl, 2-phenanthrylaminocarbonyl, 3-phenanthrylaminocarbonyl, 4-phenanthrylaminocarbonyl, and 9-phenanthrylaminocarbonyl.

Examples of the optionally substituted dialkylaminocarbonyl group having 3 to 20 carbon atoms, which may be the substituent of $Ar^1$, $Ar^2$ and $Ar^3$ in Formula (1), include those corresponding to the above-exemplified alkyl groups, specifically dimethylaminocarbonyl, diethylaminocarbonyl, di-n-propylaminocarbonyl, diisopropylaminocarbonyl, dicyclopropylaminocarbonyl, di-n-butylaminocarbonyl, diisobutylaminocarbonyl, di-sec-butylaminocarbonyl, di-tert-butylaminocarbonyl, dicyclobutylaminocarbonyl, di-1-pentylaminocarbonyl, di-2-pentylaminocarbonyl, di-3-pentylaminocarbonyl, diisopentylaminocarbonyl, di-neopentylaminocarbonyl, di-tert-pentylaminocarbonyl, dicyclopentylaminocarbonyl, di-1-hexylaminocarbonyl, di-2-hexylaminocarbonyl, di-3-hexylaminocarbonyl, dicyclohexylaminocarbonyl, di-(1-methyl-n-pentyl)aminocarbonyl, di-(1,1,2-trimethyl-n-propyl)aminocarbonyl, di-(1,2,2-trimethyl-n-propyl)aminocarbonyl, di-(3,3-dimethyl-n-butyl)aminocarbonyl, methyl(ethyl)aminocarbonyl, methyl(n-propyl)aminocarbonyl, methyl(isopropyl)aminocarbonyl, methyl(cyclopropyl)aminocarbonyl, methyl(n-butyl)aminocarbonyl, methyl(isobutyl)aminocarbonyl, methyl(sec-butyl)aminocarbonyl, methyl(tert-butyl)aminocarbonyl, methyl(cyclobutyl)aminocarbonyl, ethyl(n-propyl)aminocarbonyl, ethyl(isopropyl)aminocarbonyl, ethyl(cyclopropyl)aminocarbonyl, ethyl(n-butyl)aminocarbonyl, ethyl(isobutyl)aminocarbonyl, ethyl(sec-butyl)aminocarbonyl, ethyl(tert-butyl)aminocarbonyl, ethyl(cyclobutyl)aminocarbonyl, n-propyl(isopropyl)aminocarbonyl, n-propyl(cyclopropyl)aminocarbonyl, n-propyl(n-butyl)aminocarbonyl, n-propyl(isobutyl)aminocarbonyl, n-propyl(sec-butyl)aminocarbonyl, n-propyl(tert-butyl)aminocarbonyl, n-propyl(cyclobutyl)aminocarbonyl, isopropyl(cyclopropyl)aminocarbonyl, isopropyl(n-butyl)aminocarbonyl, isopropyl(isobutyl)aminocarbonyl, isopropyl(sec-butyl)aminocarbonyl, isopropyl(tert-butyl)carbonylamino, isopropyl(cyclobutyl)aminocarbonyl, cyclopropyl(n-butyl)aminocarbonyl, cyclopropyl(isobutyl)aminocarbonyl, cyclopropyl(sec-butyl)aminocarbonyl, cyclopropyl(tert-butyl)aminocarbonyl, cyclopropyl(cyclobutyl)aminocarbonyl, n-butyl(isobutyl)aminocarbonyl, n-butyl(sec-butyl)aminocarbonyl, n-butyl(tert-butyl)aminocarbonyl, n-butyl(cyclobutyl)aminocarbonyl, isobutyl(sec-butyl)aminocarbonyl, isobutyl(tert-butyl)aminocarbonyl, isobutyl(cyclobutyl)aminocarbonyl, sec-butyl(tert-butyl)aminocarbonyl, sec-butyl(cyclobutyl)aminocarbonyl, and tert-butyl(cyclobutyl)aminocarbonyl.

Examples of the optionally substituted diarylaminocarbonyl group having 13 to 20 carbon atoms, which may be the substituent of $Ar^1$, $Ar^2$ and $Ar^3$ in Formula (1), include those corresponding to the above-exemplified aryl groups, specifically diphenylaminocarbonyl, dinaphthylaminocarbonyl, di(p-methylphenyl)aminocarbonyl, and phenylnaphthylaminocarbonyl.

Examples of the optionally substituted alkylarylaminocarbonyl group having 8 to 20 carbon atoms, which may be the substituent of $Ar^1$, $Ar^2$ and $Ar^3$ in Formula (1), include those corresponding to the above-exemplified alkyl groups and aryl groups, specifically methylphenylamino, ethylphenylamino, isopropylphenylamino, sec-butylphenylamino, tert-butylphenylamino, n-hexylphenylamino, cyclohexylphenylamino, methylnaphthylamino, and ethylnaphthylamino.

Examples of the optionally substituted alkylcarbonylamino group having 2 to 20 carbon atoms, which may be the substituent of $Ar^1$, $Ar^2$ and $Ar^3$ in Formula (1), include those corresponding to the above-exemplified alkyl groups, specifically methylcarbonylamino, ethylcarbonylamino, n-propylcarbonylamino, isopropylcarbonylamino, n-butylcarbonylamino, isobutylcarbonylamino, sec-butylcarbonylamino, tert-butylcarbonylamino, 1-pentylcarbonylamino, 2-pentylcarbonylamino, 3-pentylcarbonylamino, isopentylcarbonylamino, neopentylcarbonylamino, tert-pentylcarbonylamino, 1-hexylcarbonylamino, 2-hexylcarbonylamino, 3-hexylcarbonylamino, and cyclohexylcarbonylamino.

Examples of the optionally substituted arylcarbonylamino group having 7 to 20 carbon atoms, which may be the substituent of $Ar^1$, $Ar^2$ and $Ar^3$ in Formula (1), include those corresponding to the above-exemplified aryl groups, specifically phenylcarbonylamino, naphthylcarbonylamino, p-methylphenylcarbonylamino, o-methylphenylcarbonylamino, p-tert-butylphenylcarbonylamino, p-methoxyphenylcarbonylamino, p-chlorophenylcarbonylamino, p-nitrophenylcarbonylamino, p-cyanophenylcarbonylamino, o-biphenylylcarbonylamino, m-biphenylylcarbonylamino, p-biphenylylcarbonylamino, α-naphthylcarbonylamino, β-naphthylcarbonylamino, 1-anthrylcarbonylamino, 2-anthrylcarbonylamino, 9-anthrylcarbonylamino, 1-phenanthrylcarbonylamino, 2-phenanthrylcarbonylamino, 3-phenanthrylcarbonylamino, 4-phenanthrylcarbonylamino, and 9-phenanthrylcarbonylamino.

Examples of the optionally substituted heterocyclic group having 2 to 20 carbon atoms, which may be the substituent of $Ar^1$, $Ar^2$ and $Ar^3$ in Formula (1), include 5- to 7-membered heterocyclic groups, such as pyridyl, pyrimidyl, furyl, thienyl, tetrahydrofuryl, dioxolanyl, benzoxazol-2-yl, tetrahydropyranyl, pyrrolidyl, imidazolidyl, pyrazolidyl, thiazolidyl, isothiazolidyl, oxazolidyl, isooxazolidyl, piperidyl, piperazyl, and morpholinyl.

In the triazine compound represented by Formula (1), from the standpoint of the transparency of a synthetic resin, the number of substituents of the substituted phenyl group is preferably 1.

In this case, in the triazine compound represented by Formula (1), the substituent of the substituted phenyl group is particularly preferably located at the para-position.

Further, in the triazine compound represented by Formula (1), from the standpoint of the transparency of a synthetic resin, it is preferred that $Ar^1$, $Ar^2$ and $Ar^3$ in Formula (1) be all different groups.

Still further, in the triazine compound represented by Formula (1), from the standpoint of the transparency of a synthetic resin, it is preferred that $Ar^1$ and $Ar^2$ be the same group, and $Ar^3$ be a group different from $Ar^1$ and $Ar^2$.

In this case, in the triazine compound represented by Formula (1), from the standpoint of the transparency of a synthetic resin, $Ar^1$ and $Ar^2$ are preferably unsubstituted phenyl groups.

Yet still further, in the triazine compound represented by Formula (1), from the standpoint of the transparency of a synthetic resin, it is preferred that $Ar^1$, $Ar^2$ and $Ar^3$ in Formula (1) be all substituted phenyl groups.

In this case, it is preferred that $Ar^1$ and $Ar^2$ have the same substituent, and $Ar^3$ have a substituent different from that of $Ar^1$ and $Ar^2$.

Yet still further, in the triazine compound represented by Formula (1), from the standpoint of the transparency of a synthetic resin, it is preferred that at least one of substituted phenyl groups have a substituent containing a carbonyl group in its structure. In this case, $Ar^3$ preferably has the substituent containing a carbonyl group in its structure.

Examples of the substituent containing a carbonyl group in its structure include a carboxy group, an aminocarbonyl group, an alkylcarbonyl group having 2 to 20 carbon atoms, an arylcarbonyl group having 7 to 20 carbon atoms, an alkylcarbonyloxy group having 2 to 20 carbon atoms, an arylcarbonyloxy group having 7 to 20 carbon atoms, an alkoxycarbonyl group having 2 to 20 carbon atoms, an aryloxycarbonyl group having 7 to 20 carbon atoms, an alkylaminocarbonyl group having 2 to 20 carbon atoms, an arylaminocarbonyl group having 7 to 20 carbon atoms, an dialkylaminocarbonyl group having 3 to 20 carbon atoms, a diarylaminocarbonyl group having 13 to 20 carbon atoms, an alkylarylaminocarbonyl group having 8 to 20 carbon atoms, an alkylcarbonylamino group having 2 to 20 carbon atoms, and an arylcarbonylamino group having 7 to 20 carbon atoms. These groups are optionally substituted with any of the above-described substituents, and the carboxy group may be in the form of a salt.

Among these groups, from the standpoint of the transparency of a synthetic resin, the substituent containing a carbonyl group in its structure is preferably a carboxy group, an aminocarbonyl group, an alkylaminocarbonyl group having 2 to 20 carbon atoms, an arylaminocarbonyl group having 7 to 20 carbon atoms, a dialkylaminocarbonyl group having 3 to 20 carbon atoms, a diarylaminocarbonyl group having 13 to 20 carbon atoms, or an alkylarylaminocarbonyl group having 8 to 20 carbon atoms, more preferably a carboxy group or an aminocarbonyl group, still more preferably an aminocarbonyl group.

Further, from the standpoint of the transparency of a synthetic resin, the triazine compound represented by Formula (1) is preferably one in which any one of $Ar^1$, $Ar^2$ and $Ar^3$ is a phenyl group that has a substituent containing a carbonyl group in its structure; more preferably one in which any one of $Ar^1$, $Ar^2$ and $Ar^3$ is a phenyl group that has a substituent containing a carbonyl group in its structure and the other two are phenyl groups that has a substituent containing no carbonyl group in its structure, or one in which any one of $Ar^1$, $Ar^2$ and $Ar^3$ is a phenyl group that has a substituent containing a carbonyl group in its structure and the other two are unsubstituted phenyl groups; still more preferably one in which any one of $Ar^1$, $Ar^2$ and $Ar^3$ is a phenyl group that has a substituent containing a carbonyl group in its structure and the other two are phenyl groups that has a substituent containing no carbonyl group in its structure.

From the standpoint of the transparency of a synthetic resin, the substituent containing a carbonyl group in its structure is preferably a carboxy group, an aminocarbonyl group, an alkylaminocarbonyl group having 2 to 20 carbon atoms, an arylaminocarbonyl group having 7 to 20 carbon atoms, a dialkylaminocarbonyl group having 3 to 20 carbon atoms, a diarylaminocarbonyl group having 13 to 20 carbon atoms, or an alkylarylaminocarbonyl group having 8 to 20 carbon atoms, more preferably a carboxy group or an aminocarbonyl group, still more preferably an aminocarbonyl group. Further, from the standpoint of the transparency of a synthetic resin, the substituent containing no carbonyl group in its structure is preferably an optionally substituted alkyl group having 1 to 20 carbon atoms or an optionally substituted aryl group having 6 to 20 carbon atoms, more preferably an alkyl group having 1 to 8 carbon atoms or an aryl group having 6 to 12 carbon atoms, still more preferably a methyl group, a cyclohexyl group, or an optionally substituted phenyl group, yet still more preferably a phenyl group or a cyclohexyl group.

Specific examples of the triazine compound represented by Formula (1) include Compounds No. 1 to No. 59 below. Thereamong, from the standpoint of imparting particularly excellent transparency to a synthetic resin, a triazine compound represented by Compound No. 49, Compound No. 50, Compound No. 58, or Compound No. 59 is particularly preferred.

Compound No. 1

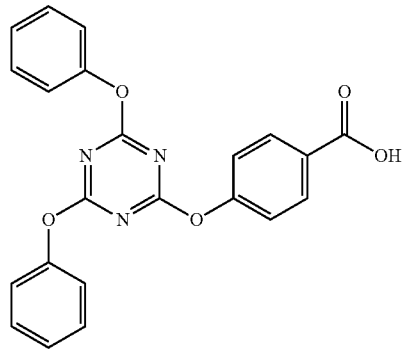

Compound No. 2

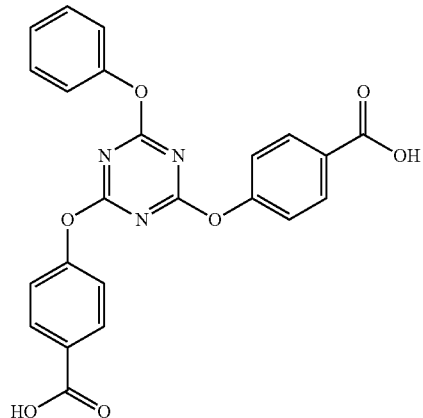

Compound No. 3

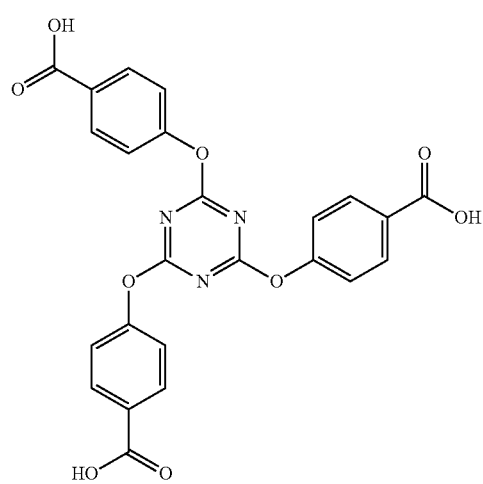

Compound No. 4

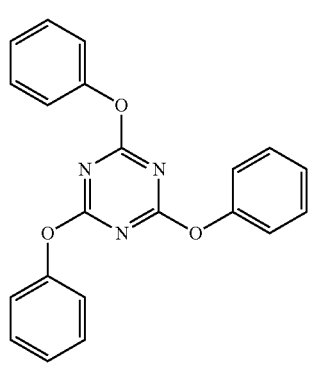

-continued
Compound No. 5
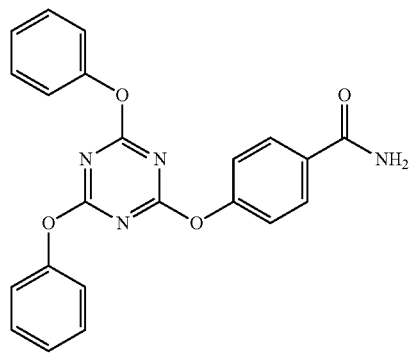
Compound No. 6
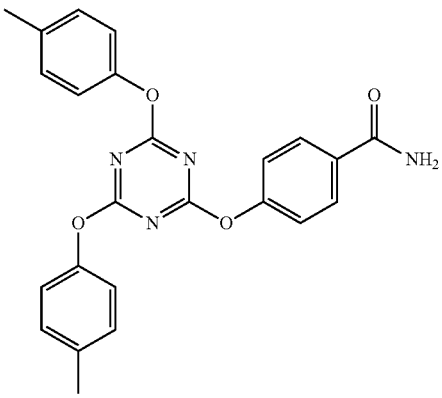
Compound No. 7
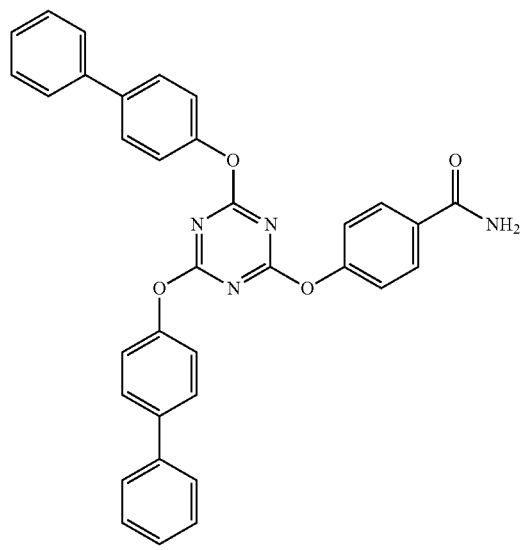
Compound No. 8
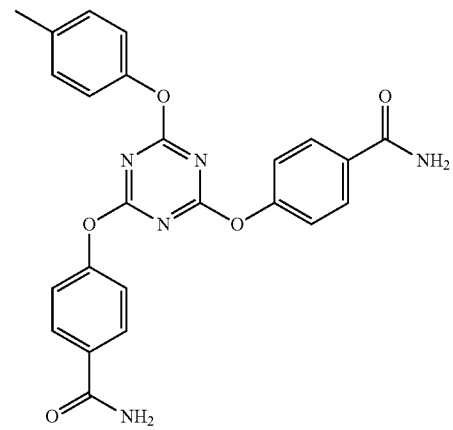
Compound No. 9
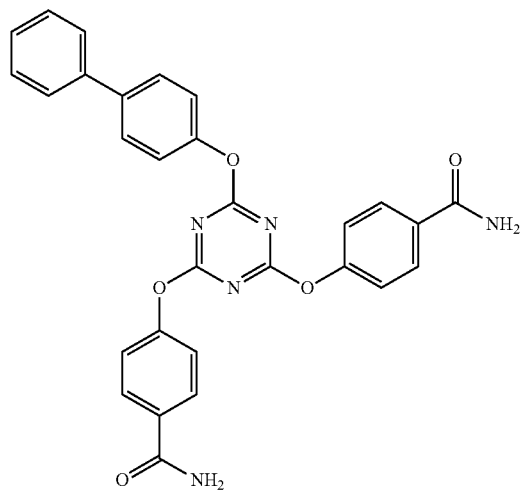
Compound No. 10
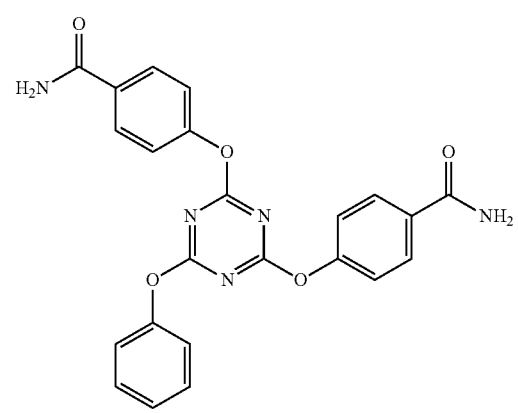

-continued
Compound No. 11
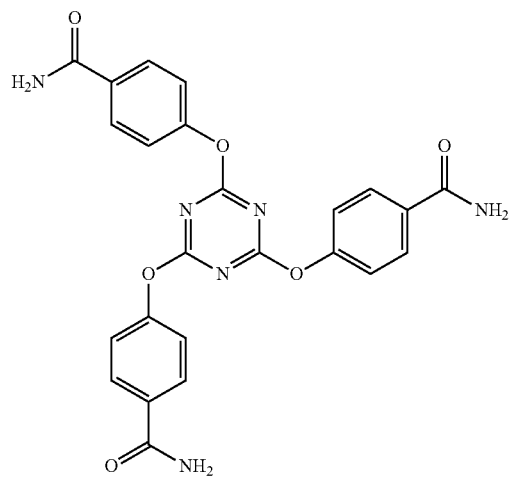
Compound No. 12
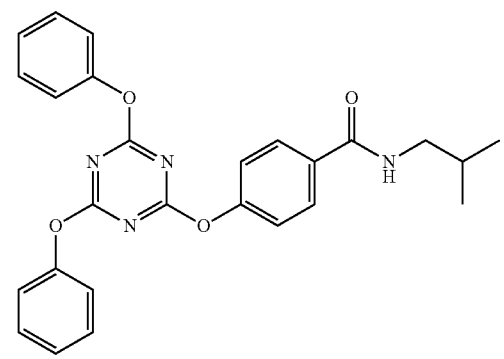
Compound No. 13
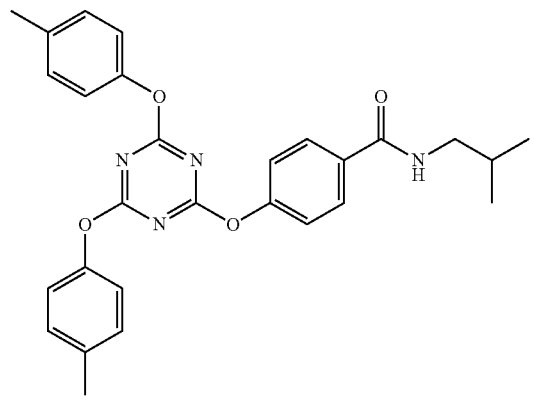
Compound No. 14
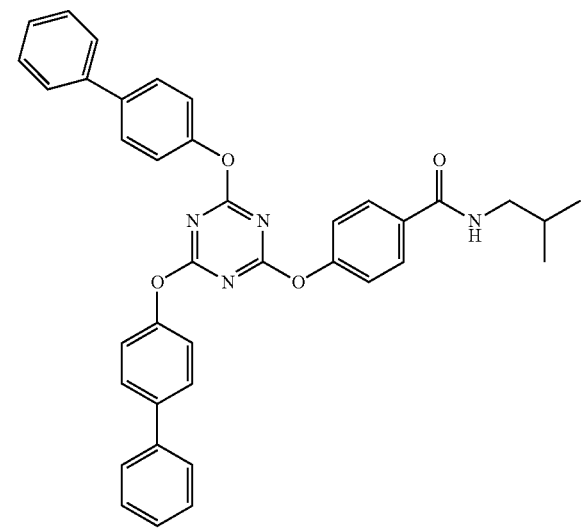
Compound No. 15
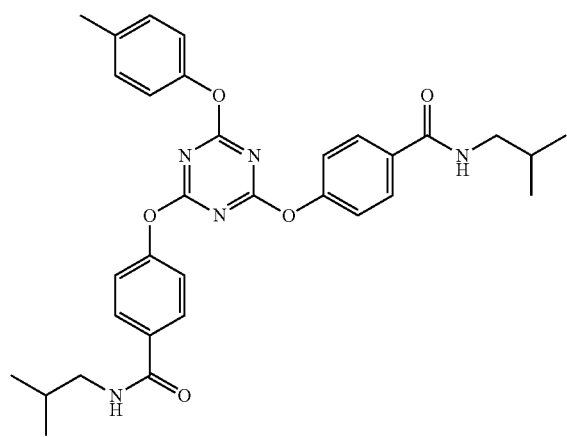
Compound No. 16
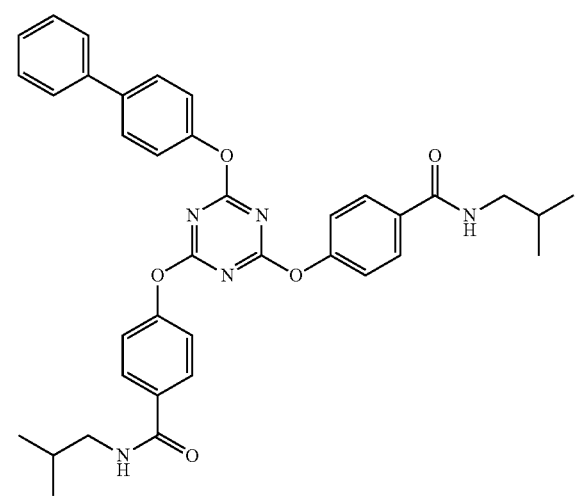

Compound No. 17
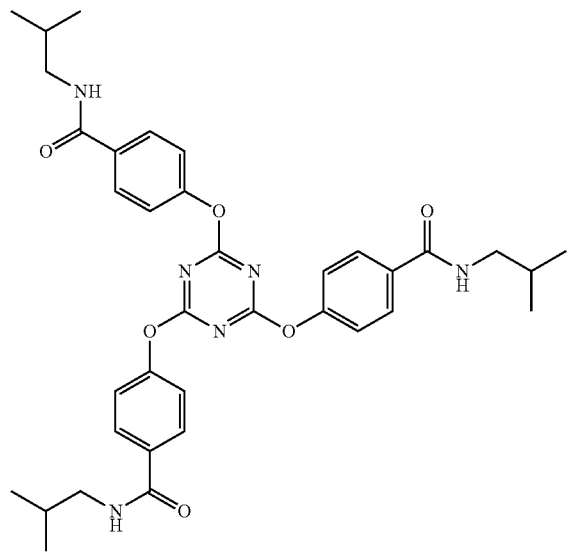
Compound No. 18
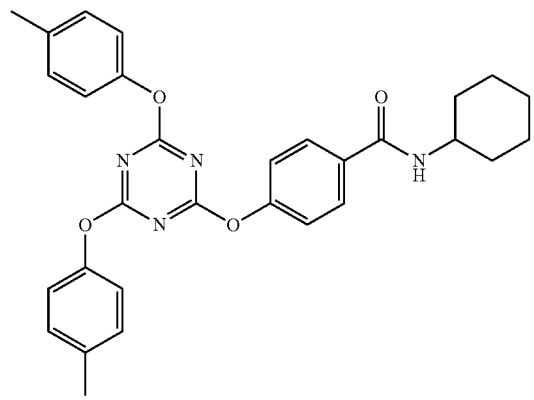
Compound No. 19
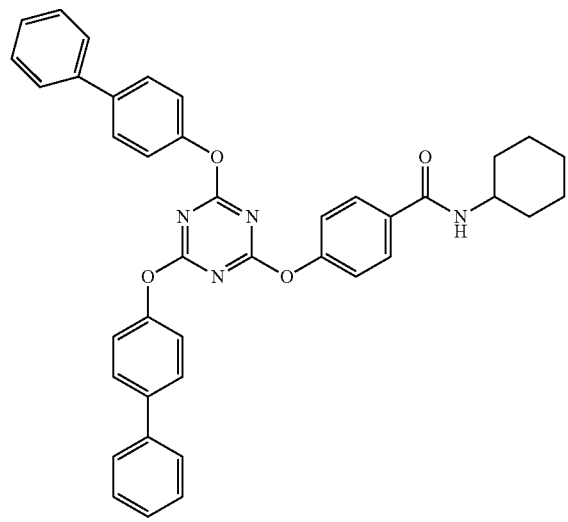
Compound No. 20
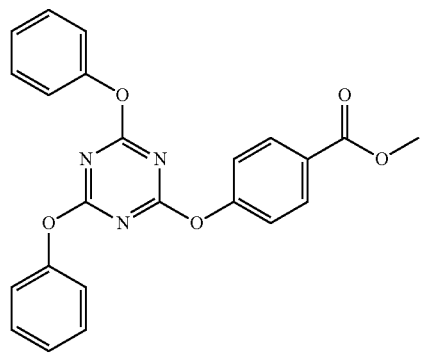
Compound No. 21
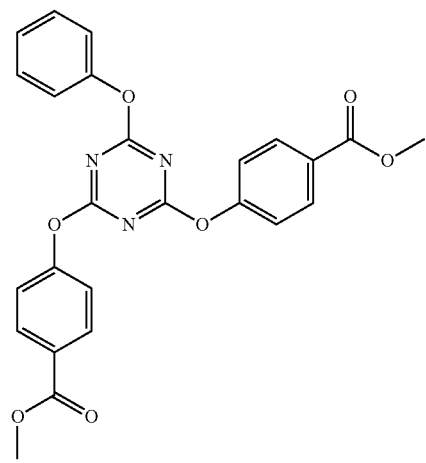
Compound No. 22
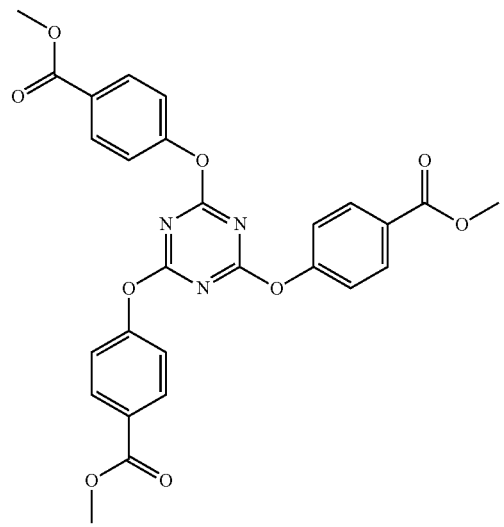

-continued
Compound No. 23
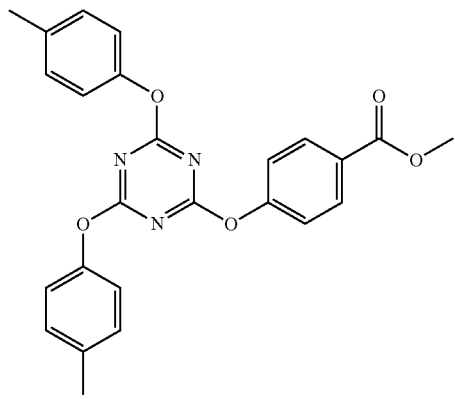
Compound No. 24
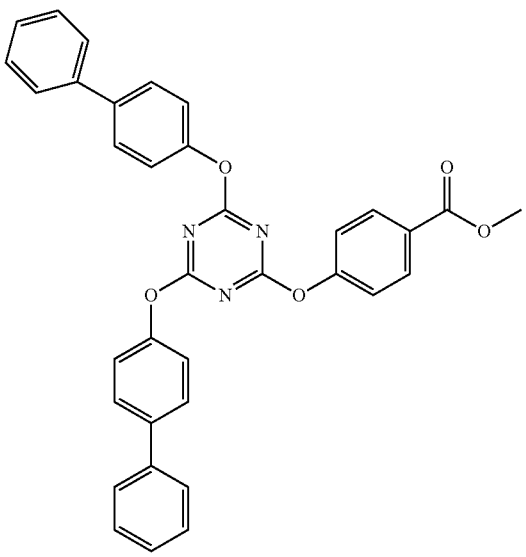
Compound No. 25
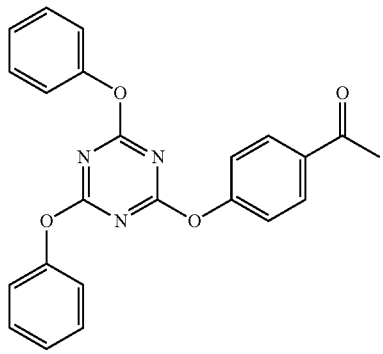
Compound No. 26
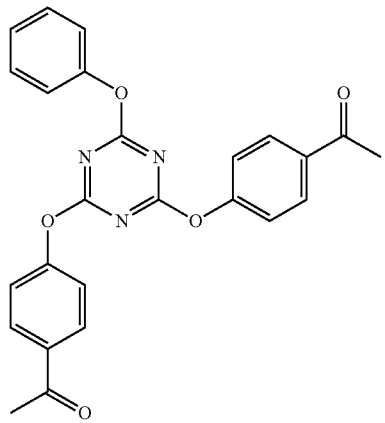
Compound No. 27
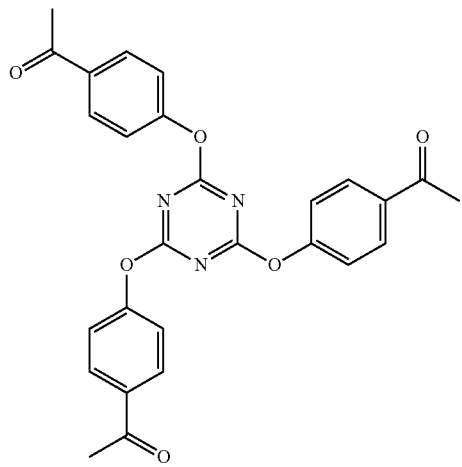
Compound No. 28
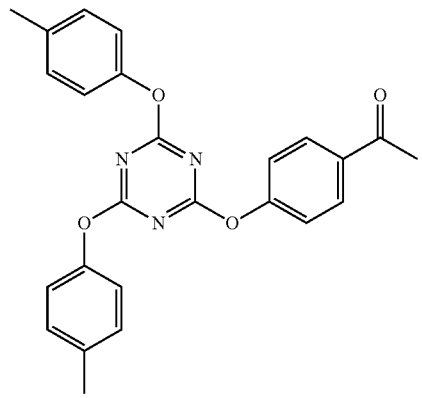

-continued
Compound No. 29
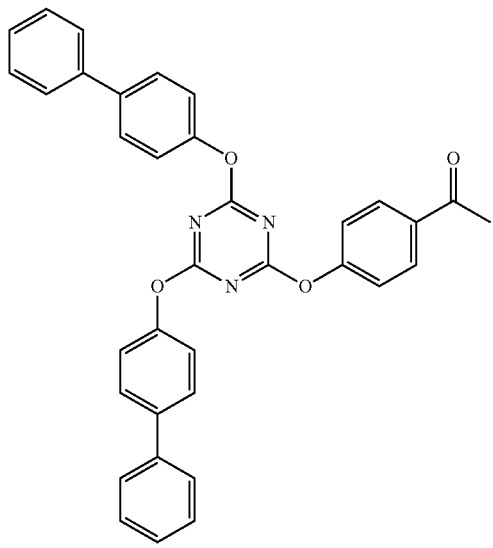
Compound No. 30
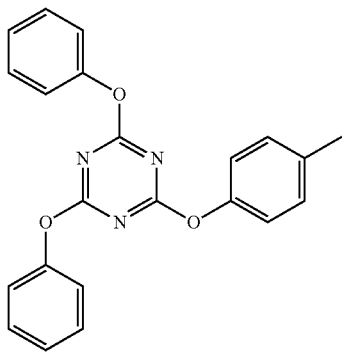
Compound No. 31
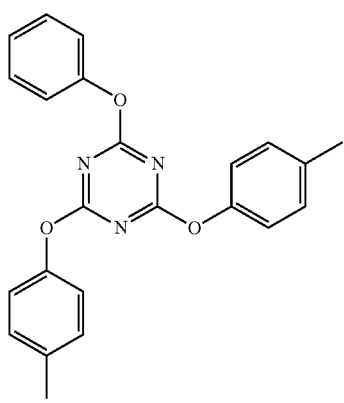
Compound No. 32
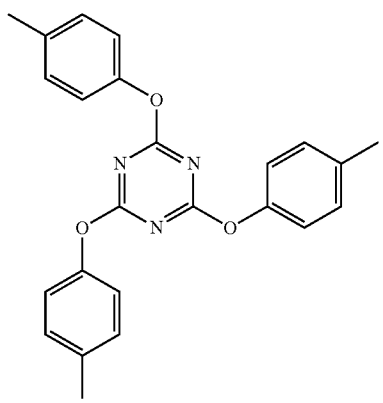
Compound No. 33
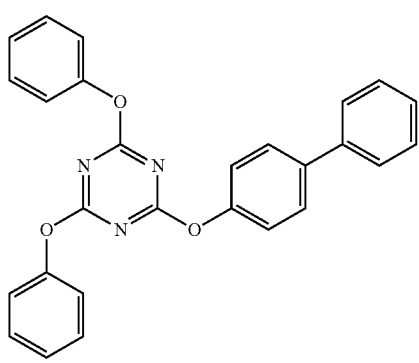
Compound No. 34
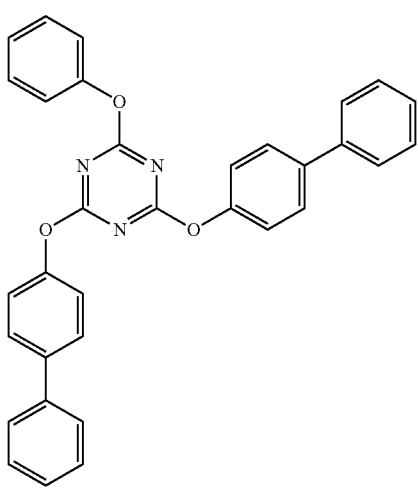

Compound No. 33
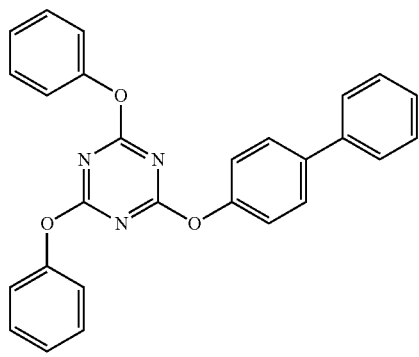
Compound No. 35
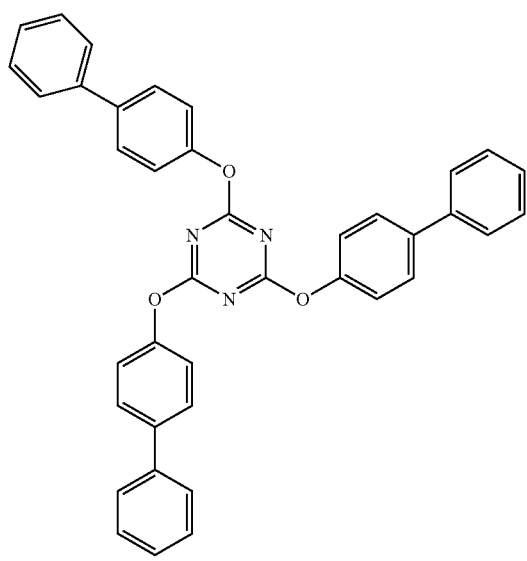
Compound No. 36
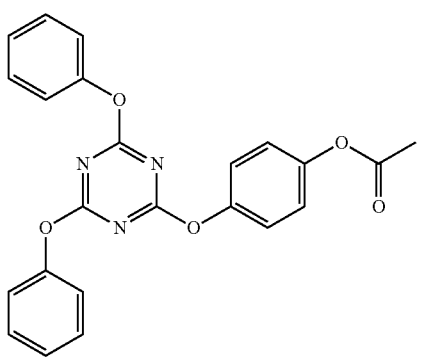
Compound No. 37
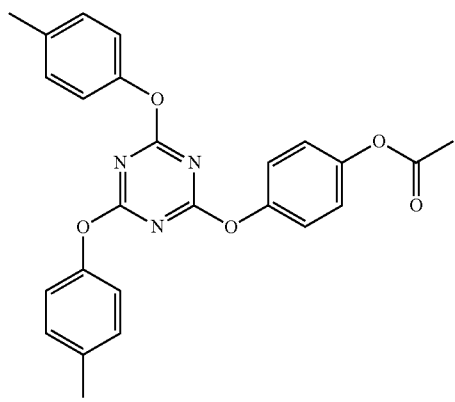
Compound No. 38
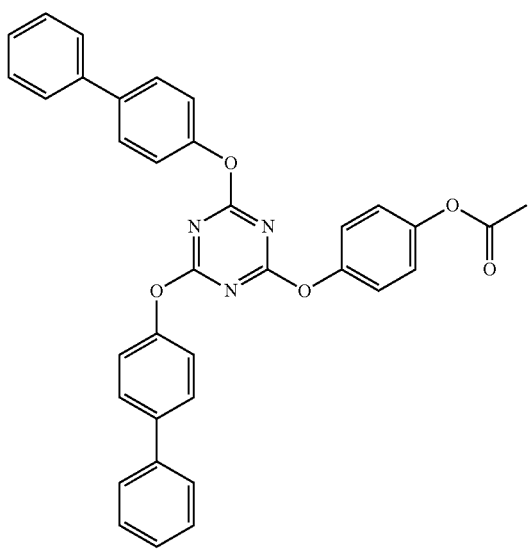

-continued
Compound No. 39
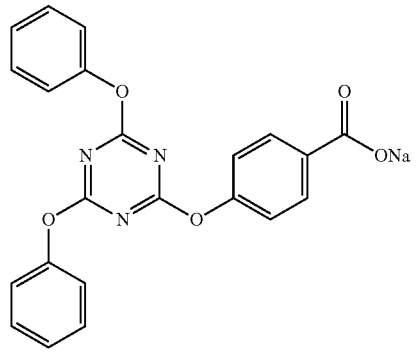
Compound No. 40
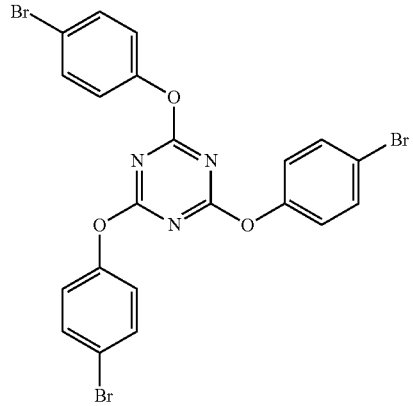
Compound No. 41
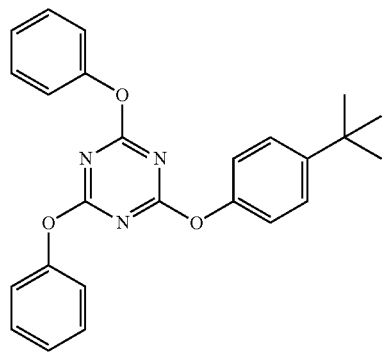
Compound No. 42
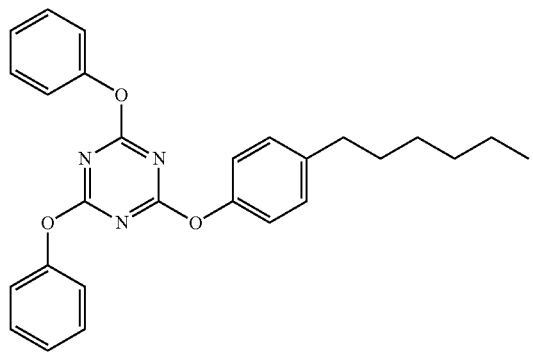
Compound No. 43
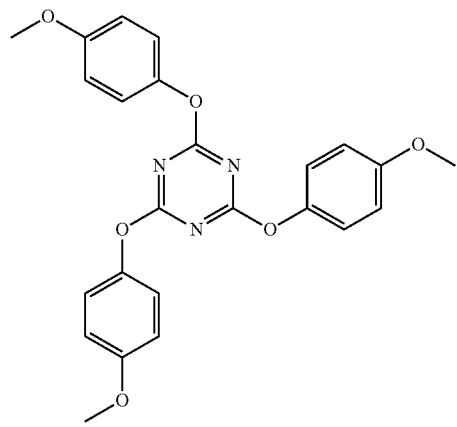
Compound No. 44
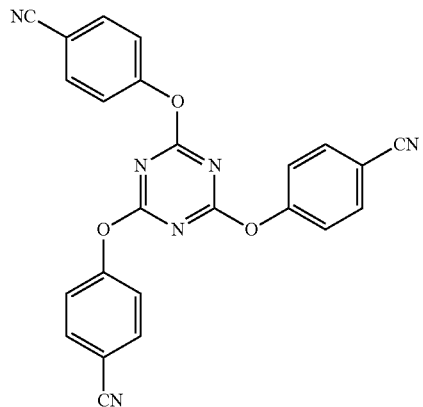
Compound No. 45
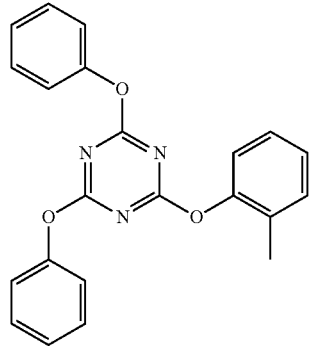
Compound No. 46
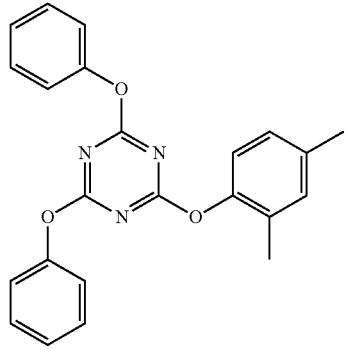

-continued
Compound No. 47
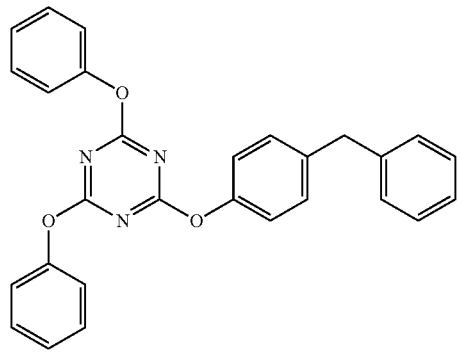
Compound No. 48
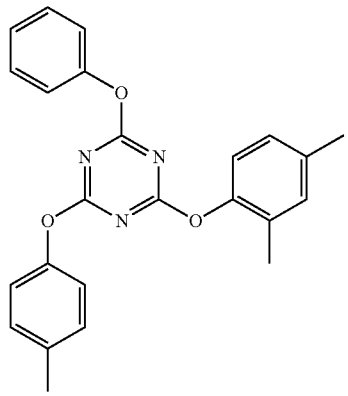
Compound No. 49
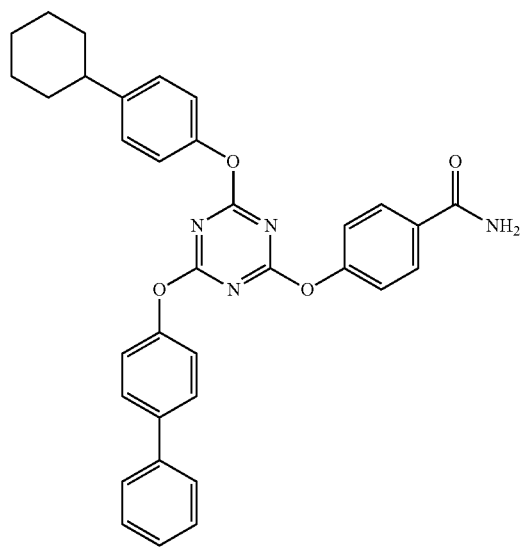
Compound No. 50
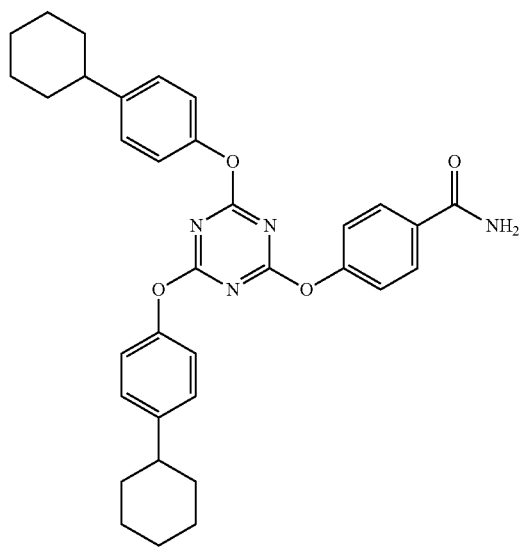
Compound No. 51
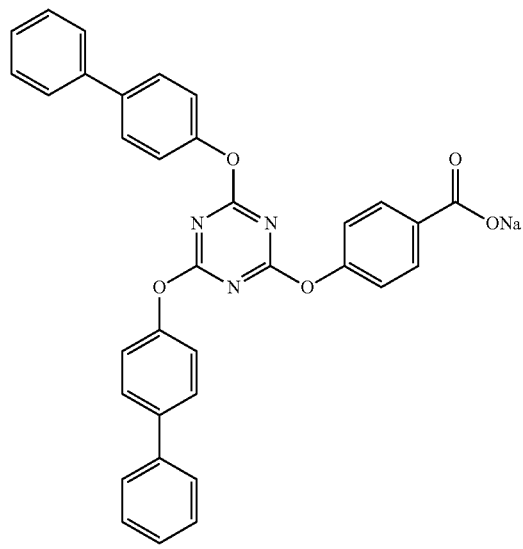
Compound No. 52
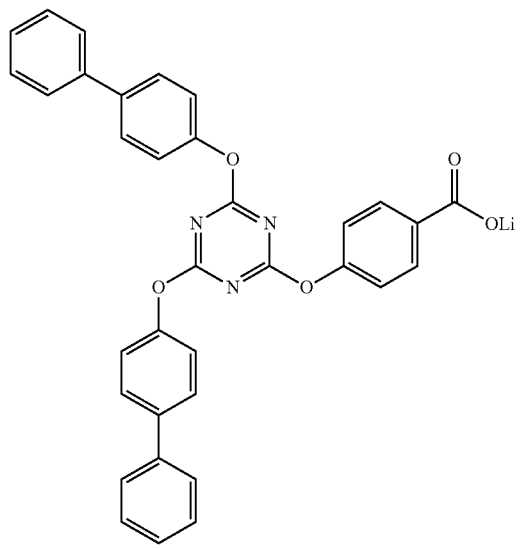

Compound No. 53
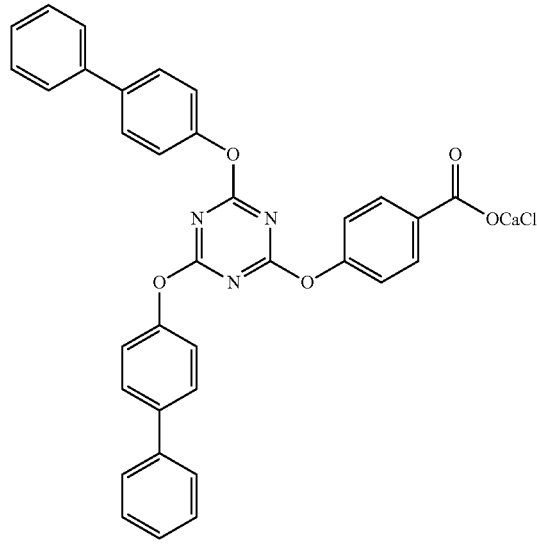
Compound No. 54
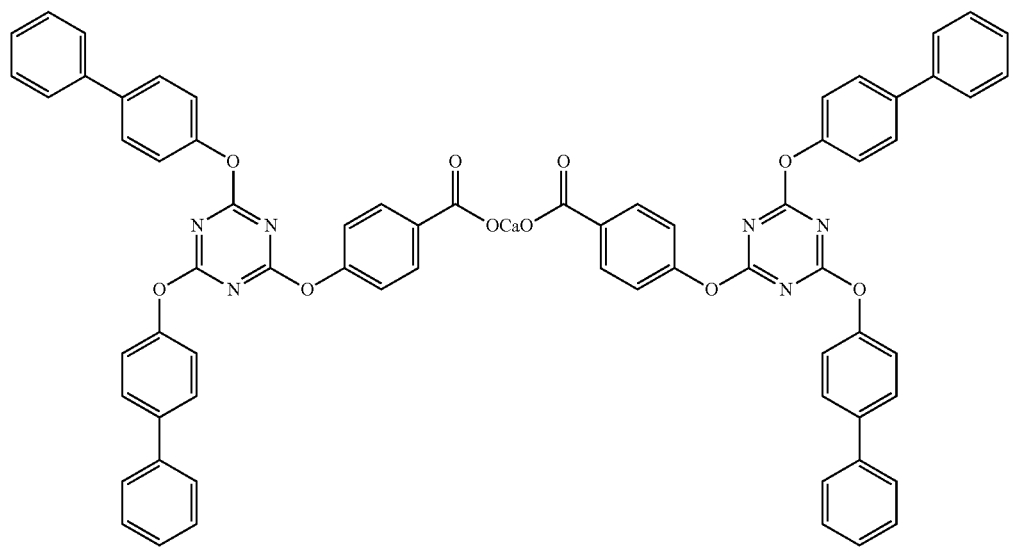
Compound No. 55
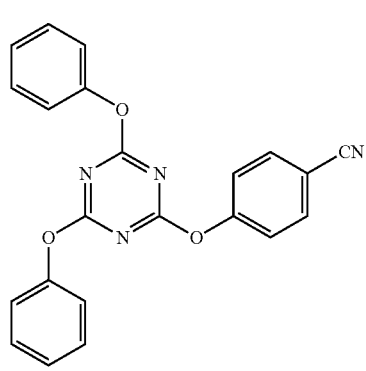
Compound No. 56
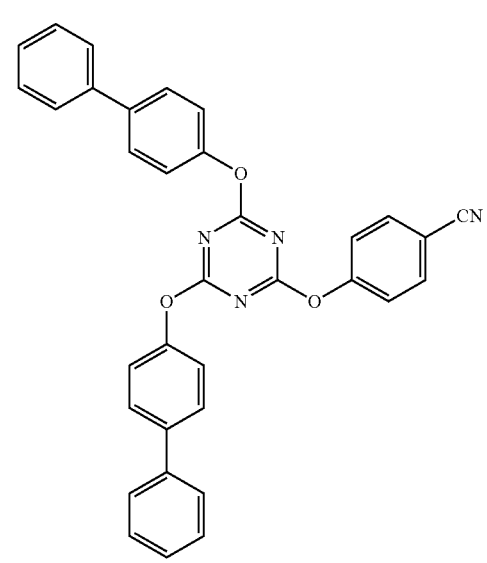

-continued

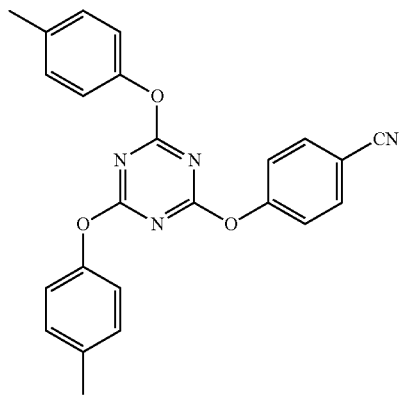
Compound No. 57

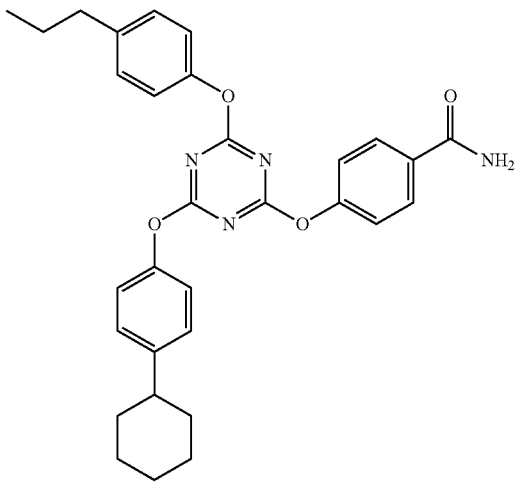
Compound No. 58

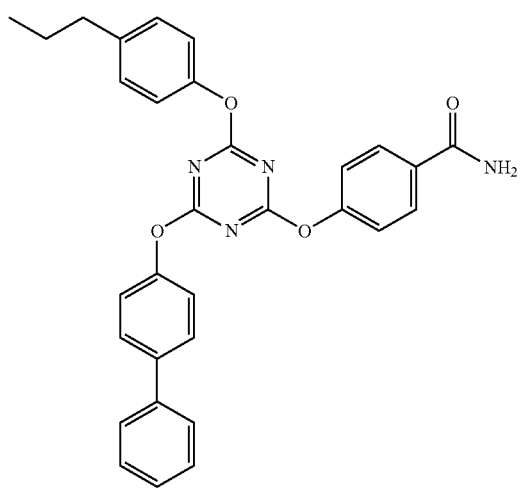
Compound No. 59

With regard to a method of producing the compound represented by Formula (1), for example, in an organic solvent, cyanuric chloride used as a raw material is allowed to sequentially react with phenol compounds each corresponding to 1 equivalent of $Ar^1$, $Ar^2$ and $Ar^3$ in the presence of 1 equivalent of a base (e.g., triethylamine or sodium hydroxide), whereby the compound represented by Formula (1) can be obtained.

The nucleating agent of the present invention contains at least one triazine compound represented by Formula (1). The nucleating agent of the present invention is used by being incorporated into a synthetic resin. The nucleating agent of the present invention can improve the transparency of the synthetic resin. Accordingly, the nucleating agent of the present invention exerts an excellent effect as a clarifying agent that improves the transparency of the synthetic resin and, therefore, can also be preferably used as a clarifying agent.

The amount of the nucleating agent of the present invention to be incorporated into a synthetic resin is, from the standpoint of the transparency of the synthetic resin, preferably 0.001 to 10 parts by mass, more preferably 0.01 to 2.0 parts by mass, still more preferably 0.02 to 1.0 parts by mass, yet still more preferably 0.02 to 0.5 parts by mass, particularly preferably 0.02 to 0.3 parts by mass, with respect to 100 parts by mass of the synthetic resin.

Next, a synthetic resin composition containing the nucleating agent of the present invention will be described in more detail.

Specific examples of a synthetic resin for which the nucleating agent of the present invention is used include: α-olefin polymers, such as polypropylenes, high-density polyethylenes, low-density polyethylenes, linear low-density polyethylenes, cross-linked polyethylenes, ultrahigh-molecular-weight polyethylenes, polybutene-1, and poly-3-methylpentene; polyolefin-based resins and copolymers thereof, such as ethylene-vinyl acetate copolymers, ethylene-ethyl acrylate copolymers, and ethylene-propylene copolymers; halogen-containing resins, such as polyvinyl chloride, polyvinylidene chlorides, chlorinated polyethylenes, chlorinated polypropylenes, polyvinylidene fluorides, chlorinated rubbers, vinyl chloride-vinyl acetate copolymers, vinyl chloride-ethylene copolymers, vinyl chloride-vinylidene chloride copolymers, vinyl chloride-vinylidene chloride-vinyl acetate ternary copolymers, vinyl chloride-acrylate copolymers, vinyl chloride-maleate copolymers, and vinyl chloride-cyclohexylmaleimide copolymers; petroleum resins; coumarone resins; polystyrenes; polyvinyl acetates; acrylic resins; polymethyl methacrylates; polyvinyl alcohols; polyvinyl formals; polyvinyl butyrals; aromatic polyesters, such as polyalkylene terephthalates (e.g., polyethylene terephthalate, polybutylene terephthalate, and polycyclohexane dimethylene terephthalate) and polyalkylene naphthalates (e.g., polyethylene naphthalate and polybutylene naphthalate); linear polyesters, such as polytetramethylene terephthalate; degradable aliphatic polyesters, such as polyhydroxy butyrate, polycaprolactone, polybutylene succinate, polyethylene succinate, polylactic acid resins, polymalic acid, polyglycolic acid, polydioxane, and poly(2-oxetanone); thermoplastic resins and blends thereof, such as polyamides (e.g., polyphenylene oxide, polycaprolactam, and polyhexamethylene adipamide), polycarbonates, branched polycarbonates, polyacetals, polyphenylene sulfides, polyurethanes, and cellulose-based resins; thermosetting resins, such as phenol resins, urea resins, melamine resins, epoxy resins, and unsaturated polyester resins; fluorocarbon resins; silicone resins; silicone rubber polyether sulfones; polysulfones; polyphenylene ethers; polyether ketones; polyether ether ketones; and liquid crystal polymers. Other examples include isoprene rubbers, butadiene rubbers, acrylonitrile-butadiene copolymer rubbers, styrene-butadiene copolymer rubbers, fluorine rubbers, and silicone rubbers. Specific examples of the synthetic resin further include olefin-based thermoplastic elastomers, styrene-based thermoplastic elastomers, polyester-based thermoplastic elastomers, nitrile-based thermoplastic elastomers, nylon-based thermoplastic elastomers, vinyl chloride-based thermoplastic elastomers, polyamide-based thermoplastic elastomers, and polyurethane-based thermoplastic elastomers. These synthetic resins may be used individually, or two or more thereof may be used in combination. These synthetic resins may be alloyed as well.

In the present invention, the above-described synthetic resins can be used regardless of, for example, the molecular weight, the polymerization degree, the density, the softening point, the insoluble component-to-solvent ratio, the degree of stereoregularity, the presence or absence of a catalyst residue, the type and blend ratio of each material monomer, and the type of a polymerization catalyst (e.g., a Ziegler catalyst or a metallocene catalyst). Among above-described synthetic resins, polyolefin-based resins are preferred from the standpoint of improvement in transparency.

Examples of the polyolefin-based resins include: α-olefin polymers, such as polyethylenes, low-density polyethylenes, linear low-density polyethylenes, high-density polyethylenes, polypropylenes, homopolypropylenes, random copolymer polypropylenes, block copolymer polypropylenes, impact copolymer polypropylenes, high-impact copolymer polypropylenes, isotactic polypropylenes, syndiotactic polypropylenes, hemi-isotactic polypropylenes, maleic anhydride-modified polypropylenes, polybutenes, cycloolefin polymers, stereo block polypropylenes, poly-3-methyl-1-butenes, poly-3-methyl-1-pentenes, and poly-4-methyl-1-pentenes; and α-olefin copolymers, such as ethylene-propylene block or random copolymers, ethylene-methyl methacrylate copolymers, and ethylene-vinyl acetate copolymers.

Further, in the synthetic resin composition of the present invention, as required, conventionally known various additives, such as a plasticizer, an antioxidant, a heat stabilizer, a light stabilizer, an ultraviolet absorber, a pigment, a colorant, a filler, an antistatic agent, a mold-release agent, a fragrance material, a lubricant, a flame retardant, a foaming agent, a filling agent, an antibacterial agent, an antifungal agent, and a crystal nucleating agent other than the nucleating agent of the present invention, may be incorporated as well.

In the synthetic resin composition of the present invention, a method of incorporating the nucleating agent of the present invention into a synthetic resin is not particularly restricted, and any conventionally known method can be employed. For example, the synthetic resin in a powder or pellet form may be mixed with the nucleating agent (and other various additives as required) by dry blending, or the nucleating agent (and other various additives as required) may be partially pre-blended and then dry-blended along with remaining components. After the dry blending, for example, the resultant may be mixed using a mill roll, a Banbury mixer, a super mixer or the like, and kneaded using a uniaxial or biaxial extruder or the like. For example, in the case of a polyolefin-based resin, the mixing and kneading are usually performed at a temperature of about 120 to 220° C. Alternatively, for example, a method in which the additives are added in the stage of polymerizing the synthetic resin (e.g., a polyolefin-based resin); a method in which, after mixing the additives in advance with, for example, a granulation aid such as a binder, a wax, a solvent, or silica at a desired ratio, the resulting mixture is granulated to prepare a one-pack composite additive and this one-pack composite additive is added to the polyolefin-based resin; or a method in which a masterbatch containing the nucleating agent (and other additives as required) at a high concentration is prepared and then added to the synthetic resin, can be employed.

In the synthetic resin composition of the present invention, as required, a variety of additives, such as a phenolic antioxidant, a phosphorus-based antioxidant, a thioether-based antioxidant, an ultraviolet absorber and a hindered amine-based light stabilizer, may also be incorporated, and the resin composition of the present invention can thereby be stabilized. These additives such as antioxidants may be incorporated into the nucleating agent of the present invention before the addition of the nucleating agent to the synthetic resin.

Examples of the phenolic antioxidant include 2,6-di-tert-butyl-p-cresol, 2,6-diphenyl-4-octadecyloxyphenol, distearyl(3,5-di-tert-butyl-4-hydroxybenzyl)phosphonate, 1,6-hexamethylene-bis[(3,5-di-tert-butyl-4-hydroxyphenyl) propionic acid amide], 4,4'-thiobis(6-tert-butyl-m-cresol), 2,2'-methylene-bis(4-methyl-6-tert-butylphenol), 2,2'-methylene-bis(4-ethyl-6-tert-butylphenol), 4,4'-butylidene-bis(6-tert-butyl-m-cresol), 2,2'-ethylidene-bis(4,6-di-tert-butylphenol), 2,2'-ethylidene-bis(4-sec-butyl-6-tert-butylphenol), 1,1,3-tris(2-methyl-4-hydroxy-5-tert-butylphenyl)butane, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 2-tert-butyl-4-methyl-6-(2-acryloyloxy-3-tert-butyl-5-methylbenzyl) phenol, stearyl(3,5-di-tert-butyl-4-hydroxyphenyl) propionate, tetrakis[3-(3,5-di-tert-butyl-4-hydroxyphenyl) propionic acid methyl]methane, thiodiethylene glycol-bis [(3,5-di-tert-butyl-4-hydroxyphenyl)propionate], 1,6-hexamethylene-bis[(3,5-di-tert-butyl-4-hydroxyphenyl) propionate], bis[3,3-bis(4-hydroxy-3-tert-butylphenyl) butyric acid]glycol ester, bis[2-tert-butyl-4-methyl-6-(2-hydroxy-3-tert-butyl-5-methylbenzyl)phenyl]terephthalate, 1,3,5-tris[(3,5-di-tert-butyl-4-hydroxyphenyl)propionyloxyethyl]isocyanurate, 3,9-bis[1,1-dimethyl-2-{(3-tert-butyl-4-hydroxy-5-methylphenyl)propionyloxy}ethyl]-2,4,8,10-tetraoxaspiro[5,5]undecane, and triethylene glycol-bis[(3-tert-butyl-4-hydroxy-5-methylphenyl)propionate]. These phenolic antioxidants are added in an amount of preferably 0.001 to 10 parts by mass, more preferably 0.05 to 5 parts by mass, with respect to 100 parts by mass of the synthetic resin.

Examples of the phosphorus-based antioxidant include trisnonylphenyl phosphite, tris[2-tert-butyl-4-(3-tert-butyl-4-hydroxy-5-methylphenylthio)-5-methylphenyl]phosphite, tridecyl phosphite, octyldiphenyl phosphite, di(decyl)monophenyl phosphite, di(tridecyl)pentaerythritol diphosphite, di(nonylphenyl)pentaerythritol diphosphite, bis(2,4-di-tert-butylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetra(tridecyl) isopropylidenediphenol diphosphite, tetra(tridecyl)-4,4'-n-butylidene-bis(2-tert-butyl-5-methylphenol)diphosphite, hexa(tridecyl)-1,1,3-tris(2-methyl-4-hydroxy-5-tert-butylphenyl)butane triphosphite, tetrakis(2,4-di-tert-butylphenyl)biphenylene diphosphonite, 9,10-dihydro-9-oxa-10-phosphaphenanthrene-10-oxide, 2,2'-methylene-bis(4,6-tert-butylphenyl)-2-ethylhexyl phosphite, 2,2'-methylene-bis(4,6-tert-butylphenyl)-octadecyl phosphite, 2,2'-ethylidene-bis(4,6-di-tert-butylphenyl)fluorophosphite, tris(2-[(2,4,8,10-tetrakis-tert-butyldibenzo[d,f] [1,3,2]dioxaphosphepin-6-yl)oxy]ethyl)amine, and phosphite of 2-ethyl-2-butylpropylene glycol and 2,4,6-tri-tert-butylphenol. These phosphorus-based antioxidants are added in an amount of preferably 0.001 to 10 parts by mass, more preferably 0.05 to 5 parts by mass, with respect to 100 parts by mass of the synthetic resin.

Examples of the thioether-based antioxidant include: dialkyl thiodipropionates, such as dilauryl thiodipropionate, dimyristyl thiodipropionate, and distearyl thiodipropionate; and pentaerythritol tetra(β-alkylmercaptopropionic acid) esters. These thioether-based antioxidants are added in an amount of preferably 0.001 to 10 parts by mass, more preferably 0.05 to 5 parts by mass, with respect to 100 parts by mass of the synthetic resin.

Examples of the ultraviolet absorber include: 2-hydroxybenzophenones, such as 2,4-dihydroxybenzophenone, 2-hydroxy-4-methoxybenzophenone, 2-hydroxy-4-octoxybenzophenone, and 5,5'-methylene-bis(2-hydroxy-4-methoxybenzophenone); 2-(2'-hydroxyphenyl) benzotriazoles, such as 2-(2'-hydroxy-5'-methylphenyl) benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl)benzotriazole, 2-(2'-hydroxy-3',5'-dicumylphenyl)benzotriazole, 2,2'-methylene-bis(4-tert-octyl-6-(benzotriazolyl)phenol), and 2-(2'-hydroxy-3'-tert-butyl-5'-carboxyphenyl)benzotriazole; benzoates, such as phenyl salicylate, resorcinol monobenzoate, 2,4-di-tert-butylphenyl-3,5-di-tert-butyl-4-hydroxybenzoate, 2,4-di-tert-amylphenyl-3,5-di-tert-butyl-4-hydroxybenzoate, and hexadecyl-3,5-di-tert-butyl-4-hydroxybenzoate; substituted oxanilides, such as 2-ethyl-2'-ethoxyoxanilide and 2-ethoxy-4'-dodecyloxanilide; cyanoacrylates, such as ethyl-α-cyano-β,β-diphenyl acrylate and methyl-2-cyano-3-methyl-3-(p-methoxyphenyl)acrylate; and triaryltriazines, such as 2-(2-hydroxy-4-octoxyphenyl)-4,6-bis(2,4-di-tert-butylphenyl)-s-triazine, 2-(2-hydroxy-4-methoxyphenyl)-4,6-diphenyl-s-triazine, and 2-(2-hydroxy-4-propoxy-5-methylphenyl)-4,6-bis(2,4-di-tert-butylphenyl)-s-triazine. These ultraviolet absorbers are added in an amount of preferably 0.001 to 30 parts by mass, more preferably 0.05 to 10 parts by mass, with respect to 100 parts by mass of the synthetic resin.

Examples of the hindered amine-based light stabilizer include 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, bis(1,2,2,6,6-pentamethyl-4-piperidyl)sebacate, bis(1-octoxy-2,2,6,6-tetramethyl-4-piperidyl)sebacate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, bis(2,2,6,6-tetramethyl-4-piperidyl)-bis(tridecyl)-1,2,3,4-butanetetracarboxylate, bis(1,2,2,6,6-pentamethyl-4-piperidyl)-bis(tridecyl)-1,2,3,4-butanetetracarboxylate, bis(1,2,2,6,6-pentamethyl-4-piperidyl)-2-butyl-2-(3,5-di-tert-butyl-4-hydroxybenzyl)malonate, 1,2,2,6,6-pentamethyl-4-piperidyl methacrylate, poly[{6-(1,1,3,3-tetramethylbutyl) amino-1,3,5-triazine-2,4-diyl}{(2,2,6,6-tetramethyl-4-piperidyl)imino}hexamethylene{(2,2,6,6-tetramethyl-4-piperidyl)imino}], 1,2,3,4-butanecarboxylic acid/2,2-bis(hydroxymethyl)-1,3-propanediol/3-hydroxy-2,2-dimethylpropanal/1,2,2,6,6-pentamethyl-4-piperidinyl ester polycondensates, bis(1,2,2,6,6-pentamethyl-4-piperidyl) =decane dioate/methyl=1,2,2,6,6-pentamethyl-4-piperidyl=sebacate mixtures, 2,2,6,6-tetramethyl-4-piperidyl methacrylate, 1-(2-hydroxyethyl)-2,2,6,6-tetramethyl-4-piperidinol/diethyl succinate polycondensates, 1,6-bis(2,2,6,6-tetramethyl-4-piperidylamino)hexane/dibromoethane polycondensates, 1,6-bis(2,2,6,6-tetramethyl-4-piperidylamino)hexane/2,4-dichloro-6-morpholino-s-triazine polycondensates, 1,6-bis(2,2,6,6-tetramethyl-4-piperidylamino)hexane/2,4-dichloro-6-tert-octylamino-s-triazin e polycondensates, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,5,8,12-tetrakis[2,4-bis(N-butyl-N-(1,2,2,6,6-pentamethyl-4-piperidyl) amino)-s-triazine-6-yl]-1,5,8,12-tetraazadodecane, 1,6,11-tris[2,4-bis(N-butyl-N-(2,2,6,6-tetramethyl-4-piperidyl) amino)-s-triazine-6-ylamino]undecane, 1,6,11-tris[2,4-bis(N-butyl-N-(1,2,2,6,6-pentamethyl-4-piperidyl)amino)-s-triazine-6-ylamino]undecane, 3,9-bis[1,1-dimethyl-2-{tris(2,2,6,6-tetramethyl-4-piperidyloxycarbonyl)butylcarbonyloxy}ethyl]-2,4,8,10-tetraoxaspiro[5.5] undecane, 3,9-bis[1,1-dimethyl-2-{tris(1,2,2,6,6-pentamethyl-4-piperidyloxycarbonyl)butylcarbonyloxy}ethyl]-2,4,8,10-tetraoxaspiro[5.5] undecane, bis(1-undecyloxy-2,2,6,6-tetramethylpiperidin-4-yl)carbonate, 2,2,6,6-tetramethyl-4-piperidyl hexadecanoate, and 2,2,6,6-tetramethyl-4-piperidyl octadecanoate. These hindered amine-based light stabilizers are added in an amount of preferably 0.001 to 30 parts by mass, more preferably 0.05 to 10 parts by mass, with respect to 100 parts by mass of the synthetic resin.

Further, when a polyolefin-based resin is used as the synthetic resin, for the purpose of neutralizing a residual catalyst in the polyolefin-based resin, it is preferred to add as a known neutralizer as required within a range that does not impair the effects of the present invention. Examples of the neutralizer include: fatty acid metal salts, such as calcium stearate, lithium stearate, and sodium stearate; and fatty acid amide compounds, such as ethylene-bis(stearamide), ethylene-bis(12-hydroxystearamide) and stearic acid amide, and these neutralizers may be used in the form of a mixture.

Further, in the synthetic resin composition of the present invention, as other additive(s), for example, a nucleating agent, such as an aromatic metal carboxylate, an alicyclic metal alkyl carboxylate, aluminum p-tert-butylbenzoate, an aromatic phosphate metal salt or a dibenzylidene sorbitol, a metallic soap, a hydrotalcite, a triazine ring-containing compound, a metal hydroxide, a phosphoric acid ester-based flame retardant, a condensed phosphate-based flame retardant, a phosphate-based flame retardant, an inorganic phosphorus-based flame retardant, a (poly)phosphate-based flame retardant, a halogen-based flame retardant, a silicon-based flame retardant, an antimony oxide such as antimony trioxide, other inorganic flame retardant aid, other organic flame retardant aid, a filler, a pigment, a lubricant, a foaming agent, and/or an antistatic agent may also be incorporated as required within a range that does not impair the effects of the present invention.

Examples of the triazine ring-containing compound include melamine, ammeline, benzoguanamine, acetoguanamine, phthalodiguanamine, melamine cyanurate, melamine pyrophosphate, butylene diguanamine, norbornene diguanamine, methylene diguanamine, ethylene dimelamine, trimethylene dimelamine, tetramethylene dimelamine, hexamethylene dimelamine, and 1,3-hexylene dimelamine.

Examples of the metal hydroxide include magnesium hydroxide, aluminum hydroxide, calcium hydroxide, barium hydroxide, zinc hydroxide, and KISUMA 5A (magnesium hydroxide manufactured by Kyowa Chemical Industry Co., Ltd.).

Examples of the phosphoric acid ester-based flame retardant include trimethyl phosphate, triethyl phosphate, tributyl phosphate, tributoxyethyl phosphate, trischloroethyl phosphate, trisdichloropropyl phosphate, triphenyl phosphate, tricresyl phosphate, cresyldiphenyl phosphate, trixylenyl phosphate, octyldiphenyl phosphate, xylenyldiphenyl phosphate, tris(isopropylphenyl)phosphate, 2-ethylhexyldiphenyl phosphate, t-butylphenyldiphenyl phosphate, bis(t-butylphenyl)phenyl phosphate, tris(t-butylphenyl) phosphate, isopropylphenyldiphenyl phosphate, bis(isopropylphenyl)diphenyl phosphate, and tris(isopropylphenyl)phosphate.

Examples of the condensed phosphate-based flame retardant include 1,3-phenylene-bis(diphenylphosphate), 1,3-phenylene-bis(dixylenylphosphate), and bisphenol A-bis(diphenylphosphate).

Examples of the (poly)phosphate-based flame retardant include ammonium salts and amine salts of (poly)phosphoric acid, such as ammonium polyphosphate, melamine polyphosphate, piperazine polyphosphate, melamine pyrophosphate, and piperazine pyrophosphate.

Examples of the above-described other inorganic flame retardant aid include inorganic compounds, such as titanium oxide, aluminum oxide, magnesium oxide, hydrotalcite, talc, and montmorillonite; and surface-treated products thereof. For example, a variety of commercially available products, such as TIPAQUE R-680 (titanium oxide: manufactured by Ishihara Sangyo Kaisha, Ltd.), KYOWAMAG 150 (magnesium oxide: manufactured by Kyowa Chemical Industry Co., Ltd.), DHT-4A (hydrotalcite: manufactured by manufactured by Kyowa Chemical Industry Co., Ltd.) and ALCAMIZER 4 (zinc-modified hydrotalcite: manufactured by manufactured by Kyowa Chemical Industry Co., Ltd.), can be used. Examples of the above-described other organic flame retardant aid include pentaerythritol.

In addition to the above, in the synthetic resin composition of the present invention, as required, additives that are usually used in synthetic resins, examples of which include a cross-linking agent, an anti-fogging agent, a plate-out inhibitor, a surface treatment agent, a plasticizer, a lubricant, a flame retardant, a fluorescent agent, an antifungal agent, an antibacterial agent, a foaming agent, a metal inactivator, a mold release agent, a pigment, a processing aid, an antioxidant, and a light stabilizer, may be incorporated within a range that does not impair the effects of the present invention.

The additives to be incorporated into the resin composition of the present invention may be directly added to the synthetic resin, or may be incorporated into the nucleating agent of the present invention, which is subsequently added to the synthetic resin.

The molded object of the present invention is obtained from the synthetic resin composition of the present invention. A molded object having excellent transparency can be efficiently obtained by molding the synthetic resin composition of the present invention. A molding method is not particularly restricted, and examples thereof include extrusion processing, extrusion molding, calender processing, injection molding, vacuum molding, rolling, compression molding, blow molding, and rotational molding. Molded objects of various shapes, such as resin plates, sheets, films, bottles, rods, containers, fibers and special shape articles, can be obtained by these methods.

EXAMPLES

The present invention will now be described in more detail by way of Examples thereof; however, the present invention is not restricted thereto.

[Synthesis of Compound Represented by Formula (1)]
Synthesis of Nucleating Agent (Compound No. 5)

A solution was prepared by dissolving 4.8 g of sodium hydroxide and 11.29 g of phenol in 300 mL of water. In another flask, 11.1 g of cyanuric chloride was dissolved in 300 mL of acetone, and the resultant was cooled to 5° C. in an ice bath. To this solution, the above-prepared phenol solution was slowly added dropwise over a period of 30 minutes such that the temperature inside the system was maintained at 10° C. or lower, and the resultant was subsequently stirred for 1 hour at room temperature. Thereafter, 300 mL of water was added to the thus obtained reaction solution, and the resulting precipitates were separated by filtration, washed with distilled water, and then dried under reduced pressure to obtain a white solid.

Subsequently, in another flask, 2.06 g of 4-hydroxybenzamide and 1.59 g of sodium carbonate were dissolved in a mixed solvent of 60 mL of distilled water and 90 mL of acetone, and 4.49 g of the above-obtained white solid was added, and the resultant was stirred for 3 hours at room temperature. Thereafter, 120 mL of water was added, and the resulting precipitates were separated by filtration, washed with distilled water, and then dried, whereby about 5 g of Compound No. 5 was obtained as a white solid.

The compounds No. 1 to No. 4, No. 6 to No. 11, No. 30 to No. 35, and No. 49 to No. 59 shown in Tables 1 to 8 were also synthesized by the same procedure.

Examples 1 to 51

A polypropylene (melt flow rate=12 g/10 min) in an amount of 100 parts by mass was mixed with 0.05 parts by mass of tetrakis[3-(3,5-di-tert-butyl-4-hydroxyphenyl)propionyloxymethyl]methane (phenolic antioxidant ADK STAB AO-60, manufactured by ADEKA Corporation), 0.1 parts by mass of tris(2,4-di-tert-butylphenyl)phosphite (phosphorus-based antioxidant ADK STAB 2112, manufactured by ADEKA Corporation), 0.05 parts by mass of calcium stearate (lubricant), and each nucleating agent shown in Table 1 to 8 in the respective amounts (parts by mass) shown in Tables 1 to 8 using a Henschel mixer (FM200, manufactured by Mitsui Mining Co., Ltd.) at 1,000 rpm for 1 minute, and the resulting mixture was extruded using a biaxial extruder (TEX-28V, manufactured by The Japan Steel Works, Ltd.) under processing conditions of a temperature of 220° C. and a screw speed of 150 rpm to produce a pellet. The thus obtained pellet was dried at 80° C. for 4 hours and then subjected to the below-described evaluations. It is noted here that each nucleating agent was pulverized using a mortar before the mixing, and only the nucleating agent that passed through a 300-μm was used.

In Example 3, a pellet was produced and evaluated in the same manner as in Example 1, except that 0.05 parts by mass of calcium stearate was not incorporated and, in Example 4, a pellet was produced and evaluated in the same manner as in Example 2, except that 0.05 parts by mass of calcium stearate was not incorporated.

Comparative Example 1

Comparative Example 1 was evaluated in the same manner as in Example 1, except that no nucleating agent was incorporated.

Comparative Example 2

Comparative Example 2 was evaluated in the same manner as in Comparative Example 1, except that 0.05 parts by mass of calcium stearate (lubricant) was not incorporated.

Comparative Examples 3 and 4

Comparative Examples 3 and 4 were evaluated in the same manner as in Example 1, except that the following Comparative Compounds 1 and 2 were used as the nucleating agent, respectively.

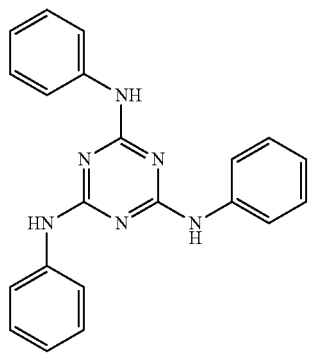

Comparative Compound-1

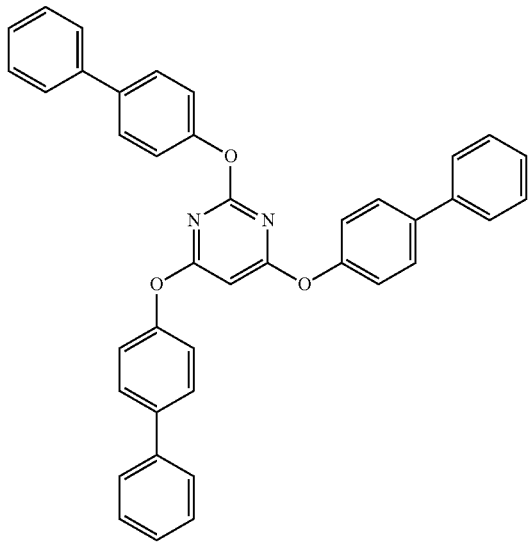

Comparative Compound-2

[Method for Measuring Crystallization Temperature]

Using a differential scanning calorimeter (DIAMOND, manufactured by PerkinElmer Co., Ltd.), each pellet was heated to 230° C. at a rate of 50° C./min, maintained for 10 minutes, and then cooled to 50° C. at a rate of −10° C./min to obtain a chart. In this chart, the temperature of an endothermic peak top appearing in the cooling process was determined as the crystallization temperature. The results thereof are shown together in Tables 1 to 8 below.

[Evaluation of Transparency (Haze Value)]

Using an injection molding machine (EC100-2A; manufactured by Toshiba Machine Co., Ltd.), each pellet was filled into a die for 40 seconds at an injection temperature of 200° C. and an injection pressure of 40 to 60 MPa, subsequently cooled for 20 seconds in the die at 40° C., and then injection-molded under the conditions for drawing a sheet from the die, whereby a 1 mm-thick square sheet of 60 mm×60 mm in size was obtained. Immediately thereafter, this sheet was left to stand for one week in an incubator having an inner temperature of 23° C., after which the haze value of the thus obtained test piece was determined using Haze Guard II (manufactured by Toyo Seiki Seisaku-sho, Ltd.). It is noted here that a lower haze value indicates superior transparency. The results thereof are shown together in Tables 1 to 8 below.

[Evaluation of Flexural Modulus]

Using an injection molding machine (EC100-2A; manufactured by Toshiba Machine Co., Ltd.), each pellet was filled into a die for 40 seconds at an injection temperature of 200° C. and an injection pressure of 40 to 60 MPa, subsequently cooled for 20 seconds in the die at 40° C., and then injection-molded under the conditions for drawing a sheet from the die, whereby a bending test piece of 80 mm in length, 10 mm in width, and 4 mm in thickness was prepared. Immediately thereafter, the thus obtained bending test piece was left to stand for one week in an incubator having an inner temperature of 23° C., after which the flexural modulus (MPa) was determined using a bending tester (AG-IS, manufactured by Shimadzu Corporation). The results thereof are shown together in Tables 1 to 8 below.

[Heat Deflection Temperature Under Load (HDT)]

Using an injection molding machine (EC100-2A; manufactured by Toshiba Machine Co., Ltd.), each pellet was filled into a die for 40 seconds at an injection temperature of 200° C. and an injection pressure of 40 to 60 MPa, subsequently cooled for 20 seconds in the die at 40° C., and then injection-molded under the conditions for drawing a sheet from the die, whereby a HDT test piece of 80 mm in length, 10 mm in width, and 4 mm in thickness was prepared. Immediately thereafter, the thus obtained HDT test piece was left to stand for one week in an incubator having an inner temperature of 23° C., after which the HDT was measured by a flat-wise method using an automatic HDT tester (manufactured by Toyo Seiki Seisaku-sho, Ltd.). The test was conducted at a heating rate of 120° C./h with a flexural stress of 1.8 MPa, and the temperature at which the amount of change in the test piece caused by a load reached 0.34 mm was determined as the heat deflection temperature under load (HDT). The results thereof are shown together in Tables 1 to 8 below.

TABLE 1

| | | Example 1 | Example 2 | Example 3 | Example 4 | Example 5 | Example 6 | Example 7 |
|---|---|---|---|---|---|---|---|---|
| Nucleating agent | No. 1 | 0.05 | 0.1 | 0.05 | 0.1 | — | — | — |
| | No. 2 | — | — | — | — | 0.1 | — | — |
| | No. 3 | — | — | — | — | — | 0.1 | — |
| | No. 4 | — | — | — | — | — | — | 0.1 |
| | No. 5 | — | — | — | — | — | — | — |
| | No. 6 | — | — | — | — | — | — | — |
| | No. 7 | — | — | — | — | — | — | — |
| | No. 8 | — | — | — | — | — | — | — |
| | No. 9 | — | — | — | — | — | — | — |
| | No. 10 | — | — | — | — | — | — | — |
| | No. 11 | — | — | — | — | — | — | — |
| | No. 30 | — | — | — | — | — | — | — |
| | No. 31 | — | — | — | — | — | — | — |
| | No. 32 | — | — | — | — | — | — | — |
| | No. 33 | — | — | — | — | — | — | — |
| | No. 34 | — | — | — | — | — | — | — |
| | No. 35 | — | — | — | — | — | — | — |
| | No. 49 | — | — | — | — | — | — | — |
| | No. 50 | — | — | — | — | — | — | — |
| | No. 51 | — | — | — | — | — | — | — |
| | No. 52 | — | — | — | — | — | — | — |
| | No. 53 | — | — | — | — | — | — | — |
| | No. 54 | — | — | — | — | — | — | — |
| | No. 55 | — | — | — | — | — | — | — |
| | No. 56 | — | — | — | — | — | — | — |
| | No. 57 | — | — | — | — | — | — | — |
| | No. 58 | — | — | — | — | — | — | — |
| | No. 59 | — | — | — | — | — | — | — |
| Comparative Compound 1 | | — | — | — | — | — | — | — |
| Comparative Compound 2 | | — | — | — | — | — | — | — |
| Crystallization Temperature (° C.) | | 110 | 111 | 115 | 118 | 111 | 103 | 103 |
| Haze (%) | | 27.0 | 25.0 | 25.2 | 18.0 | 40.1 | 50.1 | 54.6 |
| Flexural modulus (MPa) | | 1,050 | 1,066 | 1,070 | 1,090 | 1,002 | 912 | 914 |
| HDT (° C.) | | 74.0 | 75.0 | 75.1 | 76.0 | 72.9 | 68.1 | 67.4 |

TABLE 2

| | | Example 8 | Example 9 | Example 10 | Example 11 | Example 12 | Example 13 | Example 14 |
|---|---|---|---|---|---|---|---|---|
| Nucleating agent | No. 1 | — | — | — | — | — | — | — |
| | No. 2 | — | — | — | — | — | — | — |
| | No. 3 | — | — | — | — | — | — | — |
| | No. 4 | — | — | — | — | — | — | — |
| | No. 5 | 0.02 | 0.05 | 0.1 | 0.2 | — | — | — |
| | No. 6 | — | — | — | — | 0.02 | 0.05 | 0.1 |
| | No. 7 | — | — | — | — | — | — | — |
| | No. 8 | — | — | — | — | — | — | — |
| | No. 9 | — | — | — | — | — | — | — |
| | No. 10 | — | — | — | — | — | — | — |
| | No. 11 | — | — | — | — | — | — | — |
| | No. 30 | — | — | — | — | — | — | — |
| | No. 31 | — | — | — | — | — | — | — |
| | No. 32 | — | — | — | — | — | — | — |
| | No. 33 | — | — | — | — | — | — | — |
| | No. 34 | — | — | — | — | — | — | — |
| | No. 35 | — | — | — | — | — | — | — |

TABLE 2-continued

|  | | Example 8 | Example 9 | Example 10 | Example 11 | Example 12 | Example 13 | Example 14 |
|---|---|---|---|---|---|---|---|---|
| | No. 49 | — | — | — | — | — | — | — |
| | No. 50 | — | — | — | — | — | — | — |
| | No. 51 | — | — | — | — | — | — | — |
| | No. 52 | — | — | — | — | — | — | — |
| | No. 53 | — | — | — | — | — | — | — |
| | No. 54 | — | — | — | — | — | — | — |
| | No. 55 | — | — | — | — | — | — | — |
| | No. 56 | — | — | — | — | — | — | — |
| | No. 57 | — | — | — | — | — | — | — |
| | No. 58 | — | — | — | — | — | — | — |
| | No. 59 | — | — | — | — | — | — | — |
| Comparative Compound 1 | | — | — | — | — | — | — | — |
| Comparative Compound 2 | | — | — | — | — | — | — | — |
| Crystallization Temperature (° C.) | | 104 | 108 | 119 | 119 | 104 | 107 | 114 |
| Haze (%) | | 36.0 | 22.3 | 24.4 | 35.5 | 32.2 | 25.5 | 20.5 |
| Flexural modulus (MPa) | | 911 | 1,060 | 1,066 | 1,090 | 914 | 1,018 | 1,010 |
| HDT (° C.) | | 67.2 | 77.7 | 77.3 | 76.2 | 67.5 | 73.7 | 78.9 |

TABLE 3

|  | | Example 15 | Example 16 | Example 17 | Example 18 | Example 19 | Example 20 | Example 21 |
|---|---|---|---|---|---|---|---|---|
| Nucleating agent | No. 1 | — | — | — | — | — | — | — |
| | No. 2 | — | — | — | — | — | — | — |
| | No. 3 | — | — | — | — | — | — | — |
| | No. 4 | — | — | — | — | — | — | — |
| | No. 5 | — | — | — | — | — | — | — |
| | No. 6 | 0.2 | — | — | — | — | — | — |
| | No. 7 | — | 0.02 | 0.05 | 0.1 | 0.2 | — | — |
| | No. 8 | — | — | — | — | — | 0.1 | — |
| | No. 9 | — | — | — | — | — | — | 0.1 |
| | No. 10 | — | — | — | — | — | — | — |
| | No. 11 | — | — | — | — | — | — | — |
| | No. 30 | — | — | — | — | — | — | — |
| | No. 31 | — | — | — | — | — | — | — |
| | No. 32 | — | — | — | — | — | — | — |
| | No. 33 | — | — | — | — | — | — | — |
| | No. 34 | — | — | — | — | — | — | — |
| | No. 35 | — | — | — | — | — | — | — |
| | No. 49 | — | — | — | — | — | — | — |
| | No. 50 | — | — | — | — | — | — | — |
| | No. 51 | — | — | — | — | — | — | — |
| | No. 52 | — | — | — | — | — | — | — |
| | No. 53 | — | — | — | — | — | — | — |
| | No. 54 | — | — | — | — | — | — | — |
| | No. 55 | — | — | — | — | — | — | — |
| | No. 56 | — | — | — | — | — | — | — |
| | No. 57 | — | — | — | — | — | — | — |
| | No. 58 | — | — | — | — | — | — | — |
| | No. 59 | — | — | — | — | — | — | — |
| Comparative Compound 1 | | — | — | — | — | — | — | — |
| Comparative Compound 2 | | — | — | — | — | — | — | — |
| Crystallization Temperature (° C.) | | 116 | 110 | 120 | 124 | 123 | 111 | 112 |
| Haze (%) | | 28.1 | 29.7 | 18.9 | 16.4 | 31.0 | 35.2 | 40.1 |
| Flexural modulus (MPa) | | 1,089 | 1,003 | 1,129 | 1,164 | 1,151 | 1,006 | 1,012 |
| HDT (° C.) | | 77.9 | 72.9 | 78.6 | 77.2 | 77.3 | 70.0 | 72.1 |

TABLE 4

|  |  | Example 22 | Example 23 | Example 24 | Example 25 | Example 26 | Example 27 | Example 28 |
|---|---|---|---|---|---|---|---|---|
| Nucleating agent | No. 1 | — | — | — | — | — | — | — |
|  | No. 2 | — | — | — | — | — | — | — |
|  | No. 3 | — | — | — | — | — | — | — |
|  | No. 4 | — | — | — | — | — | — | — |
|  | No. 5 | — | — | — | — | — | — | — |
|  | No. 6 | — | — | — | — | — | — | — |
|  | No. 7 | — | — | — | — | — | — | — |
|  | No. 8 | — | — | — | — | — | — | — |
|  | No. 9 | — | — | — | — | — | — | — |
|  | No. 10 | 0.1 | — | — | — | — | — | — |
|  | No. 11 | — | 0.1 | — | — | — | — | — |
|  | No. 30 | — | — | 0.1 | — | — | — | — |
|  | No. 31 | — | — | — | 0.1 | — | — | — |
|  | No. 32 | — | — | — | — | 0.1 | — | — |
|  | No. 33 | — | — | — | — | — | 0.1 | — |
|  | No. 34 | — | — | — | — | — | — | 0.1 |
|  | No. 35 | — | — | — | — | — | — | — |
|  | No. 49 | — | — | — | — | — | — | — |
|  | No. 50 | — | — | — | — | — | — | — |
|  | No. 51 | — | — | — | — | — | — | — |
|  | No. 52 | — | — | — | — | — | — | — |
|  | No. 53 | — | — | — | — | — | — | — |
|  | No. 54 | — | — | — | — | — | — | — |
|  | No. 55 | — | — | — | — | — | — | — |
|  | No. 56 | — | — | — | — | — | — | — |
|  | No. 57 | — | — | — | — | — | — | — |
|  | No. 58 | — | — | — | — | — | — | — |
|  | No. 59 | — | — | — | — | — | — | — |
| Comparative Compound 1 |  | — | — | — | — | — | — | — |
| Comparative Compound 2 |  | — | — | — | — | — | — | — |
| Crystallization Temperature (° C.) |  | 109 | 105 | 108 | 108 | 104 | 103 | 103 |
| Haze (%) |  | 41.1 | 46.6 | 41.6 | 42.6 | 46.6 | 41.4 | 41.8 |
| Flexural modulus (MPa) |  | 950 | 912 | 923 | 912 | 909 | 934 | 912 |
| HDT (° C.) |  | 69.7 | 68.1 | 68.1 | 67.1 | 67.1 | 68.3 | 67.4 |

TABLE 5

|  |  | Example 29 | Example 30 | Example 31 | Example 32 | Example 33 | Example 34 | Example 35 |
|---|---|---|---|---|---|---|---|---|
| Nucleating agent | No. 1 | — | — | — | — | — | — | — |
|  | No. 2 | — | — | — | — | — | — | — |
|  | No. 3 | — | — | — | — | — | — | — |
|  | No. 4 | — | — | — | — | — | — | — |
|  | No. 5 | — | — | — | — | — | — | — |
|  | No. 6 | — | — | — | — | — | — | — |
|  | No. 7 | — | — | — | — | — | — | — |
|  | No. 8 | — | — | — | — | — | — | — |
|  | No. 9 | — | — | — | — | — | — | — |
|  | No. 10 | — | — | — | — | — | — | — |
|  | No. 11 | — | — | — | — | — | — | — |
|  | No. 30 | — | — | — | — | — | — | — |
|  | No. 31 | — | — | — | — | — | — | — |
|  | No. 32 | — | — | — | — | — | — | — |
|  | No. 33 | — | — | — | — | — | — | — |
|  | No. 34 | — | — | — | — | — | — | — |
|  | No. 35 | 0.1 | — | — | — | — | — | — |
|  | No. 49 | — | — | — | — | — | — | — |
|  | No. 50 | — | 0.02 | 0.05 | 0.1 | 0.2 | 0.3 | — |
|  | No. 51 | — | — | — | — | — | — | 0.1 |
|  | No. 52 | — | — | — | — | — | — | — |
|  | No. 53 | — | — | — | — | — | — | — |
|  | No. 54 | — | — | — | — | — | — | — |
|  | No. 55 | — | — | — | — | — | — | — |
|  | No. 56 | — | — | — | — | — | — | — |
|  | No. 57 | — | — | — | — | — | — | — |
|  | No. 58 | — | — | — | — | — | — | — |
|  | No. 59 | — | — | — | — | — | — | — |

TABLE 5-continued

|  | Example 29 | Example 30 | Example 31 | Example 32 | Example 33 | Example 34 | Example 35 |
|---|---|---|---|---|---|---|---|
| Comparative Compound 1 | — | — | — | — | — | — | — |
| Comparative Compound 2 | — | — | — | — | — | — | — |
| Crystallization Temperature (° C.) | 103 | 100.3 | 105.6 | 115.1 | 122.6 | 122.3 | 116.4 |
| Haze (%) | 46.6 | 38.3 | 34.4 | 21.0 | 10.3 | 14.5 | 25.4 |
| Flexural modulus (MPa) | 909 | 900 | 1,060 | 1,070 | 1,067 | 1,066 | 1,032 |
| HDT (° C.) | 67.2 | 67.9 | 74.9 | 77.7 | 76.2 | 76.0 | 72.0 |

TABLE 6

|  |  | Example 36 | Example 37 | Example 38 | Example 39 | Example 40 | Example 41 | Example 42 |
|---|---|---|---|---|---|---|---|---|
| Nucleating agent | No. 1 | — | — | — | — | — | — | — |
|  | No. 2 | — | — | — | — | — | — | — |
|  | No. 3 | — | — | — | — | — | — | — |
|  | No. 4 | — | — | — | — | — | — | — |
|  | No. 5 | — | — | — | — | — | — | — |
|  | No. 6 | — | — | — | — | — | — | — |
|  | No. 7 | — | — | — | — | — | — | — |
|  | No. 8 | — | — | — | — | — | — | — |
|  | No. 9 | — | — | — | — | — | — | — |
|  | No. 10 | — | — | — | — | — | — | — |
|  | No. 11 | — | — | — | — | — | — | — |
|  | No. 30 | — | — | — | — | — | — | — |
|  | No. 31 | — | — | — | — | — | — | — |
|  | No. 32 | — | — | — | — | — | — | — |
|  | No. 33 | — | — | — | — | — | — | — |
|  | No. 34 | — | — | — | — | — | — | — |
|  | No. 35 | — | — | — | — | — | — | — |
|  | No. 49 | — | — | — | — | — | — | — |
|  | No. 50 | — | — | — | — | — | — | — |
|  | No. 51 | — | — | — | — | — | — | — |
|  | No. 52 | 0.1 | — | — | — | — | — | — |
|  | No. 53 | — | 0.1 | — | — | — | — | — |
|  | No. 54 | — | — | 0.1 | — | — | — | — |
|  | No. 55 | — | — | — | 0.1 | — | — | — |
|  | No. 56 | — | — | — | — | 0.1 | — | — |
|  | No. 57 | — | — | — | — | — | 0.1 | — |
|  | No. 58 | — | — | — | — | — | — | 0.05 |
|  | No. 59 | — | — | — | — | — | — | — |
| Comparative Compound 1 |  | — | — | — | — | — | — | — |
| Comparative Compound 2 |  | — | — | — | — | — | — | — |
| Crystallization Temperature (° C.) |  | 116.0 | 113.2 | 112.3 | 112.5 | 110.8 | 103.0 | 102.6 |
| Haze (%) |  | 25.6 | 30.3 | 29.4 | 30.0 | 32.4 | 46.0 | 29.4 |
| Flexural modulus (MPa) |  | 1,035 | 1,005 | 1,002 | 1,040 | 1,023 | 920 | 914 |
| HDT (° C.) |  | 72.3 | 70.0 | 69.5 | 73.2 | 71.0 | 67.5 | 67.5 |

TABLE 7

|  |  | Example 43 | Example 44 | Example 45 | Example 46 | Example 47 | Example 48 | Example 49 |
|---|---|---|---|---|---|---|---|---|
| Nucleating agent | No. 1 | — | — | — | — | — | — | — |
|  | No. 2 | — | — | — | — | — | — | — |
|  | No. 3 | — | — | — | — | — | — | — |
|  | No. 4 | — | — | — | — | — | — | — |
|  | No. 5 | — | — | — | — | — | — | — |
|  | No. 6 | — | — | — | — | — | — | — |
|  | No. 7 | — | — | — | — | — | — | — |
|  | No. 8 | — | — | — | — | — | — | — |
|  | No. 9 | — | — | — | — | — | — | — |
|  | No. 10 | — | — | — | — | — | — | — |
|  | No. 11 | — | — | — | — | — | — | — |
|  | No. 30 | — | — | — | — | — | — | — |

TABLE 7-continued

|  | | Example 43 | Example 44 | Example 45 | Example 46 | Example 47 | Example 48 | Example 49 |
|---|---|---|---|---|---|---|---|---|
| | No. 31 | — | — | — | — | — | — | — |
| | No. 32 | — | — | — | — | — | — | — |
| | No. 33 | — | — | — | — | — | — | — |
| | No. 34 | — | — | — | — | — | — | — |
| | No. 35 | — | — | — | — | — | — | — |
| | No. 49 | — | — | — | — | — | 0.05 | 0.1 |
| | No. 50 | — | — | — | — | — | — | — |
| | No. 51 | — | — | — | — | — | — | — |
| | No. 52 | — | — | — | — | — | — | — |
| | No. 53 | — | — | — | — | — | — | — |
| | No. 54 | — | — | — | — | — | — | — |
| | No. 55 | — | — | — | — | — | — | — |
| | No. 56 | — | — | — | — | — | — | — |
| | No. 57 | — | — | — | — | — | — | — |
| | No. 58 | 0.1 | 0.2 | — | — | — | — | — |
| | No. 59 | — | — | 0.05 | 0.1 | 0.2 | — | — |
| Comparative Compound 1 | | — | — | — | — | — | — | — |
| Comparative Compound 2 | | — | — | — | — | — | — | — |
| Crystallization Temperature (° C.) | | 111.4 | 120.0 | 113.5 | 119.9 | 120.4 | 115.8 | 122.6 |
| Haze (%) | | 22.6 | 14.7 | 26.8 | 18.6 | 24.2 | 24.0 | 15.0 |
| Flexural modulus (MPa) | | 1,089 | 1,129 | 1,092 | 1,127 | 1,130 | 1,100 | 1,140 |
| HDT (° C.) | | 77.9 | 78.6 | 77.4 | 78.2 | 78.2 | 77.0 | 78.4 |

TABLE 8

|  | | Example 50 | Example 51 | Comparative Example 1 | Comparative Example 2 | Comparative Example 3 | Comparative Example 4 |
|---|---|---|---|---|---|---|---|
| Nucleating agent | No. 1 | — | — | — | — | — | — |
| | No. 2 | — | — | — | — | — | — |
| | No. 3 | — | — | — | — | — | — |
| | No. 4 | — | — | — | — | — | — |
| | No. 5 | — | — | — | — | — | — |
| | No. 6 | — | — | — | — | — | — |
| | No. 7 | — | — | — | — | — | — |
| | No. 8 | — | — | — | — | — | — |
| | No. 9 | — | — | — | — | — | — |
| | No. 10 | — | — | — | — | — | — |
| | No. 11 | — | — | — | — | — | — |
| | No. 30 | — | — | — | — | — | — |
| | No. 31 | — | — | — | — | — | — |
| | No. 32 | — | — | — | — | — | — |
| | No. 33 | — | — | — | — | — | — |
| | No. 34 | — | — | — | — | — | — |
| | No. 35 | — | — | — | — | — | — |
| | No. 49 | 0.2 | 0.3 | — | — | — | — |
| | No. 50 | — | — | — | — | — | — |
| | No. 51 | — | — | — | — | — | — |
| | No. 52 | — | — | — | — | — | — |
| | No. 53 | — | — | — | — | — | — |
| | No. 54 | — | — | — | — | — | — |
| | No. 55 | — | — | — | — | — | — |
| | No. 56 | — | — | — | — | — | — |
| | No. 57 | — | — | — | — | — | — |
| | No. 58 | — | — | — | — | — | — |
| | No. 59 | — | — | — | — | — | — |
| Comparative Compound 1 | | — | — | — | — | 0.1 | — |
| Comparative Compound 2 | | — | — | — | — | — | 0.1 |
| Crystallization Temperature (° C.) | | 124.8 | 124.6 | 103 | 103 | 103 | 103 |
| Haze (%) | | 16.0 | 20.0 | 46.6 | 46.4 | 45.6 | 47.7 |
| Flexural modulus (MPa) | | 1,162 | 1,160 | 909 | 907 | 910 | 920 |
| HDT (° C.) | | 78.9 | 78.8 | 67.1 | 67.1 | 67.6 | 67.5 |

From the results shown in Tables 1 to 8, it is seen that the transparency of the synthetic resin was improved by the respective nucleating agents according to the present invention.

The invention claimed is:

1. A method of improving the transparency of a synthetic resin, the method comprising: a step of incorporating a nucleating agent comprising at least one triazine compound represented by the following Formula (1) into the synthetic resin:

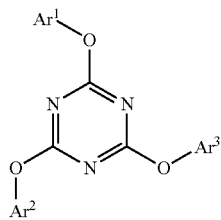

(1)

wherein $Ar^1$, $Ar^2$ and $Ar^3$ each independently represent an unsubstituted phenyl group or a substituted phenyl group.

2. The method according to claim 1, wherein, in Formula (1), the number of substituents of the substituted phenyl group is 1.

3. The method according to claim 2, wherein, in Formula (1), the substituent of the substituted phenyl group is located at the para-position.

4. The method according to claim 1, wherein, in Formula (1), $Ar^1$, $Ar^2$ and $Ar^3$ are all different groups.

5. The method according to claim 1, wherein, in Formula (1), $Ar^1$ and $Ar^2$ are the same group, and $Ar^3$ is a group different from $Ar^1$ and $Ar^2$.

6. The method according to claim 5, wherein, in Formula (1), $Ar^1$ and $Ar^2$ are unsubstituted phenyl groups.

7. The method according to claim 1, wherein, in Formula (1), $Ar^1$, $Ar^2$ and $Ar^3$ are all substituted phenyl groups.

8. The method according to claim 7, wherein, in Formula (1), $Ar^1$ and $Ar^2$ have the same substituent, and $Ar^3$ has a substituent different from that of $Ar^1$ and $Ar^2$.

9. The method according to claim 1, wherein at least one of substituted phenyl groups in Formula (1) has a substituent containing a carbonyl group in its structure.

10. The method according to claim 9, wherein, in Formula (1), $Ar^3$ has the substituent containing a carbonyl group in its structure.

11. A synthetic resin composition, comprising:
a synthetic resin; and
a nucleating agent comprising at least one triazine compound represented by the following Formula (1):

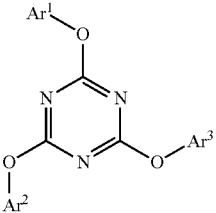

(1)

wherein $Ar^1$, $Ar^2$ and $Ar^3$ each independently represent an unsubstituted phenyl group or a substituted phenyl group,
wherein the content of the nucleating agent is 0.001 to 10 parts by mass with respect to 100 parts by mass of the synthetic resin, and
wherein the synthetic resin is a polyolefin-based resin.

12. A molded object, comprising the synthetic resin composition according to claim 11.

13. The method according to claim 2, wherein, in Formula (1), $Ar^1$, $Ar^2$ and $Ar^3$ are all different groups.

14. The method according to claim 3, wherein, in Formula (1), $Ar^1$, $Ar^2$ and $Ar^3$ are all different groups.

15. The method according to claim 2, wherein, in Formula (1), $Ar^1$ and $Ar^2$ are the same group, and $Ar^3$ is a group different from $Ar^1$ and $Ar^2$.

16. The method according to claim 3, wherein, in Formula (1), $Ar^1$ and $Ar^2$ are the same group, and $Ar^3$ is a group different from $Ar^1$ and $Ar^2$.

17. The method according to claim 2, wherein, in Formula (1), $Ar^1$, $Ar^2$ and $Ar^3$ are all substituted phenyl groups.

18. The method according to claim 3, wherein, in Formula (1), $Ar^1$, $Ar^2$ and $Ar^3$ are all substituted phenyl groups.

19. A method of producing a synthetic resin composition, the method comprising:
a step of incorporating a nucleating agent comprising at least one triazine compound represented by the following Formula (1) into a synthetic resin:

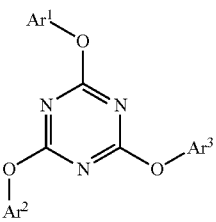

(1)

wherein $Ar^1$, $Ar^2$ and $Ar^3$ each independently represent an unsubstituted phenyl group or a substituted phenyl group,
wherein the content of the nucleating agent is 0.001 to 10 parts by mass with respect to 100 parts by mass of the synthetic resin, and
wherein the synthetic resin is a polyolefin-based resin.

* * * * *